United States Patent
Zhang et al.

(10) Patent No.: US 12,252,603 B2
(45) Date of Patent: Mar. 18, 2025

(54) REGIOSELECTIVELY SUBSTITUTED CELLULOSE ESTER BASED C+ COMPENSATION FILMS WITH IMPROVED WAVELENGTH DISPERSION

(71) Applicant: Eastman Chemical Company, Kingsport, TN (US)

(72) Inventors: Qianqian Zhang, Kingsport, TN (US); Bin Wang, Kingsport, TN (US); Robert Jacks Sharpe, Madison, AL (US); Wesley Wayne McConnell, Gray, TN (US); Casey Lynn Elkins, Kingsport, TN (US); Charles Michael Buchanan, Bluff City, TN (US)

(73) Assignee: Eastman Chemical Company, Kingsport, TN (US)

( * ) Notice: Subject to any disclaimer, the term of this patent is extended or adjusted under 35 U.S.C. 154(b) by 396 days.

(21) Appl. No.: 17/760,458

(22) PCT Filed: Feb. 10, 2021

(86) PCT No.: PCT/US2021/017363
§ 371 (c)(1),
(2) Date: Aug. 10, 2022

(87) PCT Pub. No.: WO2021/163121
PCT Pub. Date: Aug. 19, 2021

(65) Prior Publication Data
US 2023/0138841 A1 May 4, 2023

Related U.S. Application Data

(60) Provisional application No. 62/975,873, filed on Feb. 13, 2020.

(51) Int. Cl.
*C08L 1/32* (2006.01)
*C08J 5/18* (2006.01)
(Continued)

(52) U.S. Cl.
CPC . *C08L 1/32* (2013.01); *C08J 5/18* (2013.01); *C08K 5/07* (2013.01); *C08K 5/3492* (2013.01);
(Continued)

(58) Field of Classification Search
CPC ......... C08L 1/32; C08L 2203/16; C08K 5/07; C08K 5/3492; C08J 5/18; C08J 2301/32; G02B 5/3083
See application file for complete search history.

(56) References Cited

U.S. PATENT DOCUMENTS

2017/0306054 A1* 10/2017 Boone .................... H10K 50/86
2017/0307796 A1    10/2017 Boone et al.

FOREIGN PATENT DOCUMENTS

WO    WO-2019190756 A1 * 10/2019 ................ C08L 1/14

OTHER PUBLICATIONS

Buchanan, Charles M. et al.; "Preparation of Cellulose [1-$^{13}$C] Acetates and Determination of Monomer Composition by NMR Spectroscopy"; Macromolecules, 1991, 24, pp. 3050-3059.
(Continued)

*Primary Examiner* — Bijan Ahvazi
(74) *Attorney, Agent, or Firm* — Kenrick L. Vidale

(57) ABSTRACT

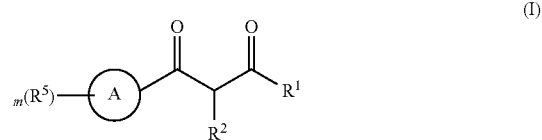

(I)

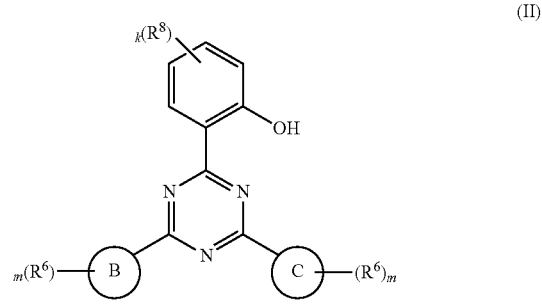

(II)

The present application discloses films comprising regioselectively substituted cellulose esters and a component A (Continued)

$$R_e = (n_x - n_y) \times d$$

$$R_{th} = \left(n_z - \frac{n_x + n_y}{2}\right) \times d$$

$$N_z = \frac{n_x - n_z}{n_x - n_y}$$

wherein rings A, B, C, $R^1$, $R^2$, $R^5$, $R^6$, $R^8$, m, n, and k are defined herein. The films are C+ films that exhibit improved wavelength dispersion. <

12 Claims, 2 Drawing Sheets

(51) Int. Cl.
*C08K 5/07* (2006.01)
*C08K 5/3492* (2006.01)
*G02B 5/30* (2006.01)

(52) U.S. Cl.
CPC ....... *C08J 2301/32* (2013.01); *C08L 2203/16* (2013.01); *G02B 5/3083* (2013.01)

(56) References Cited

OTHER PUBLICATIONS

Notification of Transmittal of the International Search Report and the Written Opinion of the International Searching Authority, or the Declarations date of mailing May 11, 2021 received in International Application No. PCT/US2021/017363.

\* cited by examiner $$R_e = (n_x - n_y) \times d$$

$$R_{th} = \left(n_z - \frac{n_x + n_y}{2}\right) \times d$$

$$N_z = \frac{n_x - n_z}{n_x - n_y}$$

REGIOSELECTIVELY SUBSTITUTED CELLULOSE ESTER BASED C+ COMPENSATION FILMS WITH IMPROVED WAVELENGTH DISPERSION

CROSS-REFERENCE TO RELATED APPLICATION(S)

This application is a national stage filing under 35 USC § 371 of International Application Number PCT/US2021/017363, filed on Feb. 10, 2021, which claims the benefit of the filing date to U.S. Provisional Application No. 62/975,873, filed on Feb. 13, 2020, the entire disclosures of which are incorporated by reference herein.

BACKGROUND OF THE INVENTION

C+ films have been widely used in displays. They are usually used in multilayer structures together with A+ films to improve the display viewing quality. Currently, C+ films can be made from several different materials, such as liquid-crystal-based materials and polystyrene derivatives. Cellulose esters have also been utilized to prepare C+ films. For example, US Pat, Pub. No, 20170306054 discloses regioselectively substituted cellulose esters that can be used to make C+ films. However, the wavelength dispersion of C+ films is usually normal, which means the $\Delta n_{th}$ or $R_{th}$ of the C+ films at short wavelengths is larger than at long wavelengths resulting in color shifts. Therefore, there is still a large unmet need for C+ films with improved wavelength dispersion, This application discloses C+ films comprising formulated regioselectively substituted cellulose esters that exhibit improved wavelength dispersion.

SUMMARY OF THE INVENTION

The present application discloses a film, comprising:
(1) a regioselectively substituted cellulose ester comprising:
  (i) a plurality of aromatic-CO— substituents;
  (ii) a plurality of a first unsaturated or saturated $(C_{1-6})$ alkyl-CO— substituents; and
  (iii) a plurality of hydroxyl substituents;
  wherein:
    the degree of substitution for the hydroxyl ("$DS_{OH}$") is from 0 to 0.7,
    the degree of substitution for the aromatic-CO— substituent ("$DS_{ArCo}$") is from 0.8 to 1.6,
    the degree of substitution for the $(C_{1-6})$alkyl-CO— substituent ("$DS_{Ak}$") is from 0.9-2.2, and
    the aromatic-CO— is an $(C_{6-20})$aryl-CO—, wherein the aryl is unsubstituted or substituted by 1-5 $R^1$; and
(2) a component A that is

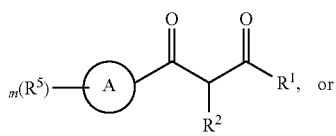

or

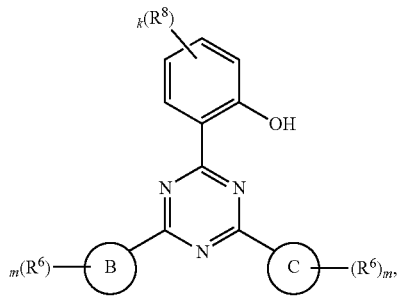

wherein:
  ring A is an $(C_{6-20})$aryl or a 5 to 10-member heteroaryl containing 1-4 heteroatoms chosen from N, O, or S;
  ring B is $(C_{6-20})$aryl or a 5 to 10-membered heteroaryl containing 1-4 heteroatoms chosen from N, O, or S;
  ring C is $(C_{6-20})$aryl or a 5 to 10-membered heteroaryl containing 1-4 heteroatoms chosen from N, O, or S;
  $R^1$ is saturated or unsaturated $(C_{1-20})$alkyl, saturated or unsaturated haloalkyl, saturated or unsaturated $(C_{1-20})$alkoxy, $(C_{6-20})$aryl optionally by 1-5 substituted by saturated or unsaturated $(C_{1-20})$ alkyl, saturated or unsaturated halo$(C_{1-20})$alkyl, saturated or unsaturated $(C_{1-20})$alkoxy, saturated or unsaturated halo$(C_{1-20})$ alkoxy, halo; 5 to 10-membered heteroaryl containing 1-4 heteroatoms chosen from N, O, or S; —$CH_2C(O)$—$R^3$;
  $R^2$ is independently hydrogen, saturated or unsaturated $(C_{1-20})$alkyl, or saturated or unsaturated halo$(C_{1-20})$ alkyl;
  $R^3$ is saturated or unsaturated $(C_{1-20})$alkyl, saturated or unsaturated halo$(C_{1-20})$alkyl, $(C_{6-20})$aryl, or 5 to 10-membered heteroaryl containing 1-4 heteroatoms chosen from N, O, or S, wherein the aryl or heteroaryl are unsubstituted or substituted by 1-5 $R^6$:
  $R^4$ is saturated or unsaturated $(C_{1-20})$alkyl, saturated or unsaturated hetero$(C_{1-20})$alkyl containing 1-2 heteroatoms chosen from N, O, or S, saturated or unsaturated halo$(C_{1-20})$alkyl, saturated or unsaturated $(C_{1-20})$alkoxy-$(C_{1-20})$alkyl, saturated or unsaturated $(C_{1-20})$alkoxy-hydroxy$(C_{1-20})$alkyl, saturated or unsaturated $(C_{1-20})$ alkyl-CO—$(C_{1-20})$alkyl saturated or unsaturated $(C_{1-20})$alkyl-CO, saturated or unsaturated $(C_{1-20})$alkyl-O—CO—$C_{(1-20)}$alkyl, saturated or unsaturated $(C_{1-20})$alkyl-COO—$C_{(1-20)}$ alkyl, saturated or unsaturated $(C_{1-20})$alkoxy-$(C_{1-20})$ alkyl-COO—$(C_{1-20})$alkyl, saturated or unsaturated $(C_{1-20})$alkoxy-$(C_{1-20})$alkyl-O—CO—$(C_{1-20})$ alkyl, $(C_{6-10})$aryl, 5- to 10-membered heteroaryl containing 1-4 heteroatoms selected from the group consisting of N, O, or S,
    wherein each of the groups is unsubstituted or substituted by 1-3 hydroxyl, saturated or unsaturated $(C_{1-20})$alkyl, saturated or unsaturated halo$(C_{1-20})$ alkyl, saturated or unsaturated $(C_{1-20})$ alkoxy, saturated or unsaturated halo$(C_{1-20})$alkoxy. saturated or unsaturated hydroxy$(C_{1-20})$alkyl, saturated or unsaturated $(C_{1-20})$alkoxy-$(C_{1-20})$alkyl, saturated or unsaturated $(C_{1-20})$alkoxy-hydroxy $(C_{1-20})$alkyl, saturated or unsaturated $(C_{1-20})$ alkoxy-$(C_{1-20})$alkyl-CO—$(C_{1-20})$ alkylsaturated or unsaturated $(C_{1-20})$alkyl-CO, saturated or unsaturated $(C_{1-20})$alkyl-COO, saturated or unsaturated $(C_{1-20})$ alkyl-O—CO—$C_{(1-20)}$alkyl, saturated or unsaturated $(C_{1-20})$ alkyl-COO—$C_{(1-20)}$alkyl, saturated or unsaturated $(C_{1-20})$ alkoxy-$(C_{1-20})$alkyl-COO—$(C_{1-20})$alkyl, or $(C_{1-20})$alkoxy-$(C_{1-20})$ alkyl-O—CO—$(C_{1-20})$alkyl;

each $R^5$ is independently hydroxy, cyano, saturated or unsaturated alkyl, saturated or unsaturated haloalkyl, saturated or unsaturated alkoxy, saturated or unsaturated haloalkoxy, or halo;

each $R^6$ is independently hydroxy, cyano, saturated or unsaturated $(C_{1-20})$alkyl, saturated or unsaturated halo$(C_{1-20})$alkyl, saturated or unsaturated $(C_{1-20})$ alkoxy, saturated or unsaturated halo$(C_{1-20})$ alkoxy, saturated or unsaturated $(C_{1-20})$alkyl-CO—, saturated or unsaturated $(C_{1-20})$alkyl-COO, saturated or unsaturated $(C_{1-20})$ alkyl-O—CO—, saturated or unsaturated $(C_{1-20})$alkyl-COO-alkyl, saturated or unsaturated $(C_{1-20})$alkyl-O—CO—$(C_{1-20})$alkyl, or halo or $(C_{6-20})$aryl, wherein the aryl is unsubstituted or substituted by 1-5 $R^7$;

each $R^7$ is independently hydroxyl, saturated or unsaturated $(C_{1-6})$ alkyl, saturated or unsaturated halo$(C_{1-6})$alkyl, or saturated or unsaturated $(C_{1-6})$ alkoxy;

each $R^8$ is $R^4$—O—, hydroxy, saturated or unsaturated $(C_{1-20})$alkyl, saturated or unsaturated halo $(C_{1-20})$alkyl, saturated or unsaturated $(C_{1-20})$alkyl-CO—$(C_{1-20})$alkyl, $(C_{1-20})$alkenyl, $(C_{1-20})$ alkenyl-O, saturated or unsaturated $(C_{1-20})$alkyl-COO—$(C_{1-20})$ alkyl, saturated or unsaturated $(C_{1-20})$alkyl-COO, saturated or unsaturated $(C_{1-20})$alkyl-O—CO, saturated or unsaturated $(C_{1-20})$ alkyl-CO, saturated or unsaturated $(C_{1-20})$alkoxy-$(C_{1-20})$alkyl-CO—O—$(C_{1-20})$alkyl, saturated or unsaturated $(C_{1-20})$alkoxy-$(C_{1-20})$ alkyl-O—CO—$(C_{1-20})$alkyl, saturated or unsaturated hetero$(C_{1-20})$ alkyl, containing 1-2 heteroatoms chosen N, O, or S, $(C_{6-10})$ aryl, 5- to 10-membered heteroaryl containing 1-4 heteroatoms chosen from N, O, or S, wherein each of the groups are unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$ alkoxy, saturated or unsaturated halo$(C_{1-20})$alkoxy, saturated or unsaturated hydroxy$(C_{1-20})$alkyl, saturated or unsaturated $(C_{1-20})$ alkoxy-$(C_{1-20})$alkyl, saturated or unsaturated $(C_{1-20})$alkoxy-hydroxy $(C_{1-20})$alkyl, or $(C_{1-20})$alkoxy-$(C_{1-20})$alkyl-CO—$(C_{1-20})$alkyl, saturated or unsaturated $(C_{1-20})$alkyl-CO, saturated or unsaturated $(C_{1-20})$alkyl-COO, saturated or unsaturated $(C_{1-20})$ alkyl-O—CO—$C_{(1-20)}$alkyl, saturated or unsaturated $(C_{1-20})$alkyl-COO—$C_{(1-20)}$alkyl, saturated or unsaturated $(C_{1-20})$alkoxy-$(C_{1-20})$ alkyl-COO—$(C_{1-20})$alkyl, or $(C_{1-20})$alkoxy-$(C_{1-20})$alkyl-O—CO—$(C_{1-20})$ alkyl;

each m is 1, 2, 3, 4, or 5; and n is 1, 2, 3, 4, or 5;

wherein:

component A is present at less than 30 wt %, based on the total weight of the composition, the thickness of the film ("d") in microns is from 1 μm to 200 μm, the film exhibits a $R_e$(589 nm) that is in the range of −10 nm to 10 nm, the ratio of the $R_{th}$(589 nm) and d (nm) multiplied by $10^3$ is greater than 1.0, the $R_e$(589 nm) is the in-plane retardation measured at 589 nm, the $R_{th}$(589 nm) is the out-of-plane retardation measured at 589 nm.

BRIEF DESCRIPTION OF THE FIGURES

The present application makes reference to the following figures, wherein.

DETAILED DESCRIPTION OF THE INVENTION

Figure 1:
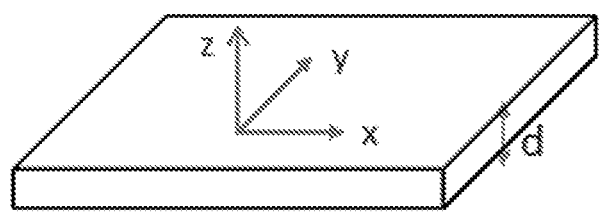
FIG. 1 provides a schematic representation defining the parameters for a compensation film FIG. 2 provides diagrams for the modes for wavelength dispersion in compensation films: (a) normal wavelength dispersion, (b) flat wavelength dispersion, and (c) reverse wavelength dispersion.

The present invention may be understood more readily by reference to the following detailed description of the invention and the examples provided therein. It is to be understood that this invention is not limited to the specific methods, formulations, and conditions described, as such may vary. It is also to be understood that the terminology used herein is for the purpose of describing particular aspects of the invention only and is not intended to be limiting.

Definitions

In this specification and in the claims that follow, reference will be made to a number of terms, which shall be defined to have the following meanings.

Values may be expressed as "about" or "approximately" a given number. Similarly, ranges may be expressed herein as from "about" one particular value and/or to "about" or another particular value. When such a range is expressed, another aspect includes from the one particular value and/or to the other particular value. Similarly, when values are expressed as approximations, by use of the antecedent "about," it will be understood that the particular value forms another aspect.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "includes," and "include" have the same open-ended meaning as "comprising," "comprises," and "comprise" provided above.

Regioselectively substituted cellulose esters suitable for use in making optical films can comprise a plurality of alkyl-acyl or alkyl-CO— substituents, a plurality of aryl-acyl or aryl-CO— substituents, heteroaryl-acyl or heteroaryl-CO— substituents. As used herein, the term "acyl substituent" or "R-CO—" shall denote a substituent having the structure:

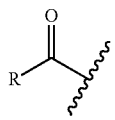

Such acyl or R—CO— groups in cellulose esters are generally bound to the pyranose ring of the cellulose via an ester linkage (i.e., through an oxygen atom).

Aromatic-CO— is an acyl substituent with an aromatic containing ring system. Examples include aryl-CO— or heteroaryl-CO—. Specific examples include benzoyl, naphthoyl, and furoyl, each being unsubstituted or substituted.

As used herein, the term "aryl-acyl" substituent shall denote an acyl substituent where "R" is an aryl group. As used herein, the term "aryl" shall denote a univalent group formed by removing a hydrogen atom from a ring carbon in an arene (i.e., a mono- or polycyclic aromatic hydrocarbon). In some cases the aryl-acyl group is preceded by the carbon units: For example, $(C_{5-6})$aryl-acyl, $(C_{6-12})$aryl-acyl, or $(C_{6-20})$aryl-acyl. Examples of aryl groups suitable for use in various embodiments include, but are not limited to, phenyl, benzyl, tolyl, xylyl, and naphthyl. Such aryl groups can be substituted or unsubstituted.

As used herein, the term "alkyl-acyl" shall denote an acyl substituent where "R" is an alkyl group. As used herein, the term "alkyl" shall denote a univalent group formed by removing a hydrogen atom from a non-aromatic hydrocarbon, and may include heteroatoms. Alkyl groups suitable for use herein can be straight, branched, or cyclic, and can be saturated or unsaturated. Alkyl groups suitable for use herein include any $(C_{1-20})$, $(C_{1-12})$, $(C_{1-5})$, or $(C_{1-3})$ alkyl groups. In various embodiments, the alkyl can be a $C_{1-5}$ straight chain alkyl group. In still other embodiments, the alkyl can be a $C_{1-3}$ straight chain alkyl group. Specific examples of suitable alkyl groups include, but are not limited to, methyl, ethyl, n-propyl, isopropyl, n-butyl, isobutyl, sec-butyl, tert-butyl, pentyl, hexyl, octyl, decyl, dodecyl, cyclopentyl, and cyclohexyl groups. Examples of alkyl-acyl groups include acetyl, propionyl, butyroyl, and the like.

"Heteroalkyl" is an alkyl wherein one or more carbon atoms is replaced with a heteroatom chosen from N, O, or S.

"Haloalkyl" means an alkyl substituent where at least one hydrogen is replaced with a halogen group. The carbon units in the haloalkyl group is often included; for example halo$(C_{1-6})$alkyl. The haloalkyl group can be straight or branched. Nonlimiting examples of haloalkyl include chloromethyl, trifluoromethyl, dibromoethyl and the like.

"Heteroaryl" means an aryl where at least one of the carbon units in the aryl ring is replaced with a heteroatom such as O, N, and S. The heteroaryl is ring can be monocyclic or polycyclic. Often the units making up the heteroaryl ring system is include; for example a 5- to 20-membered ring system. A 5-membered heteroaryl means a ring system having five atoms forming the heteroaryl ring. Nonlimiting examples of heteroaryl include pyridinyl, guinolinyl, pyrimidinyl, thiophenyl and the like.

"Alkoxy" means alkyl-O— or an alkyl group terminally attached to an oxygen group. Often the carbon units are included; for example $(C_{1-6})$alkoxy. Nonlimiting examples of alkoxy include Methoxy, ethoxy, propoxy and the like.

"Haloalkoxy" means alkoxy where at least one of the hydrogens is replace with a halogen. Often the carbon units are included; for example halo$(C_{1-6})$alkoxy. Nonlimiting examples of haloalkoxy include trifluoromethoxy, bromomethoxy, 1-bromo-ethoxy and the like.

"Halo" means halogen such as fluoro, chloro, bromo, or iodo.

"Degree of Substitution" is used to describe the average substitution level of the substituents of the substituents per anhydroglucose unit ("AGU"). Generally, conventional cellulose contains three hydroxyl groups in each AGU that can be substituted. Therefore, the DS can have a value between 0 and 3. However, low molecular weight cellulose mixed esters can have a total degree of substitution slightly above 3 from end group contributions. Low molecular weight cellulose mixed esters are discussed in more detail subsequently in this disclosure. Because DS is a statistical mean value, a value of 1 does not assure that every AGU has a single substituent. In some cases, there can be unsubstituted anhydroglucose units, some with two and some with three substituents, and more often than not the value will be a noninteger. Total DS is defined as the average number of all of substituents per anhydroglucose unit, not including the hydroxyl substituents. The degree of substitution per AGU can also refer to a particular substituent, such as, for example, hydroxyl, acetyl, butyryl, or propionyl. Additionally, the degree of substitution can specify which carbon unit of the anhydroglucose unit.

When the degree of substitution refers to hydroxyl, i.e., $DS_{OH}$, the reference is to the average hydroxyl groups per anhydroglucose that are not substituted. As a result, $DS_{OH}$ is not used in the calculation of the total degree of substitution.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

The present description uses specific numerical values to quantify certain parameters relating to the invention, where the specific numerical values are not expressly part of a numerical range. It should be understood that each specific numerical value provided herein is to be construed as providing literal support for a broad, intermediate, and narrow range. The broad range associated with each specific numerical value is the numerical value plus and minus 60 percent of the numerical value, rounded to two significant digits. The intermediate range associated with each specific numerical value is the numerical value plus and minus 30 percent of the numerical value, rounded to two significant digits. The narrow range associated with each specific numerical value is the numerical value plus and minus 15 percent of the numerical value, rounded to two significant digits. For example, if the specification describes a specific temperature of 62° F., such a description provides literal support for a broad numerical range of 25° F. to 99° F. (62° F.+/− 37° F.), an intermediate numerical range of 43° F. to 81° F. (62° F. +/− 19° F.), and a narrow numerical range of 53° F. to 71° F. (62° F. +/−9° F.). These broad, intermediate, and narrow numerical ranges should be applied not only to the specific values, but should also be applied to differences between these specific values. Thus, if the specification describes a first pressure of 110 psia and a second pressure of 48 psia (a difference of 62 psi), the broad, intermediate, and narrow ranges for the pressure difference between these two streams would be 25 to 99 psi, 43 to 81 psi, and 53 to 71 psi, respectively.

Throughout this application, where patents or publications are referenced, the disclosures of these references in their entireties are intended to be incorporated by reference into this application, to the extent they are not inconsistent with the present invention, in order to more fully describe the state of the art to which the invention pertains.

Compensation films are important to improve the viewing quality of liquid crystal displays (LCD) and organic light emitting diode displays (OLED). Birefringence of compensation films are critical for the display qualities. It is widely used in-plane birefringence ($\Delta n_e$) and out-of-plane birefringence ($\Delta n_{th}$) to characterize the compensation films. $\Delta n_e$ and $\Delta n_{th}$ are defined by the following equations.

$$\Delta n_e = (n_x - n_y)$$

$$\Delta n_{th} = [n_z - (n_x + n_y)/2]$$

Usually for films made of polymers, usually stretched is required to generate birefringence. Polymer films are along one direction (x direction), $n_x$ is the refractive index along the stretching direction in the film plane while $n_y$ is the refractive index perpendicular to the stretching direction in the film plane, and $n_z$ is the refractive index perpendicular to the film plane. For films with negative $\Delta n_e$, refractive index along the stretch direction is smaller than that along the direction orthogonal to the stretch direction, which means $n_x < n_y$. Therefore, for films with negative birefringence, $n_x$ is along fast axis in the film plane, and $n_y$ is along the slow axis. For films with positive $\Delta n_e$, refractive index along the stretch direction is larger than that along the direction orthogonal to the stretch direction, which means $n_x > n_y$. Therefore, for films with positive birefringence, $n_x$ is defined as refractive index along slow axis in the film plane, and $n_y$ is along the fast axis. For films that were not stretched or films that $\Delta n_e$ is 0, $n_x$ is the refractive index along the slow axis in the film plane while $n_y$ is the refractive index along the fast axis in the film plane, and $n_z$ is the refractive index perpendicular to the film plane. Correspondingly, in-plane retardation ($R_e$) and out-of-plane retardation ($R_{th}$) are defined as the products of $\Delta n_e$ with the thickness of the compensation film (d) and $\Delta n_{th}$ with d.

$$R_e = (n_x - n_y) * d$$

$$R_{th} = [n_z - (n_x + n_y)/2] * d$$

In addition, $N_z$ coefficient is also widely used, as defined by the following equation.

$$N_z = (n_x - n_z)/(n_x - n_y) = R_{th}/R_e + 0.5$$

Depending on the application field, various compensation films have been developed, such as biaxial films where all of three refractive indices are different ($n_x \neq n_y$, $n_x \neq n_z$, and $n_y \neq n_z$), and uniaxial films where two of the refractive indices are very close but different from the third one ($n_x = n_y \neq n_z$, $n_x = n_z \neq n_y$, $n_y = n_z \neq n_x$). For uniaxial films, there are A+ films, A− films, C+ films and C− films, which are defined by the following equations.

$$A+: n_x > n_y = n_z; N_z \text{ coefficient} = 1$$

$$A-: n_x < n_y = n_z; N_z \text{ coefficient} = 1$$

$$C+: n_x = n_y < n_z; N_z \text{ coefficient} = \infty$$

$$C-: n_x = n_y > n_z; N_z \text{ coefficient} = \infty$$

For films with negative $\Delta n_e$ or $R_e$, $n_x$ is along fast axis in the film plane. For films with positive $\Delta n_e$ or $R_e$, $n_x$ is along slow axis in the film plane. For films that were not stretched or films that $\Delta n_e$ is 0, $n_x$ is the refractive index along the slow axis in the film plane while $n_y$ is the refractive index along the fast axis in the film plane, and $n_z$ is the refractive index perpendicular to the film plane.

Figure 2:
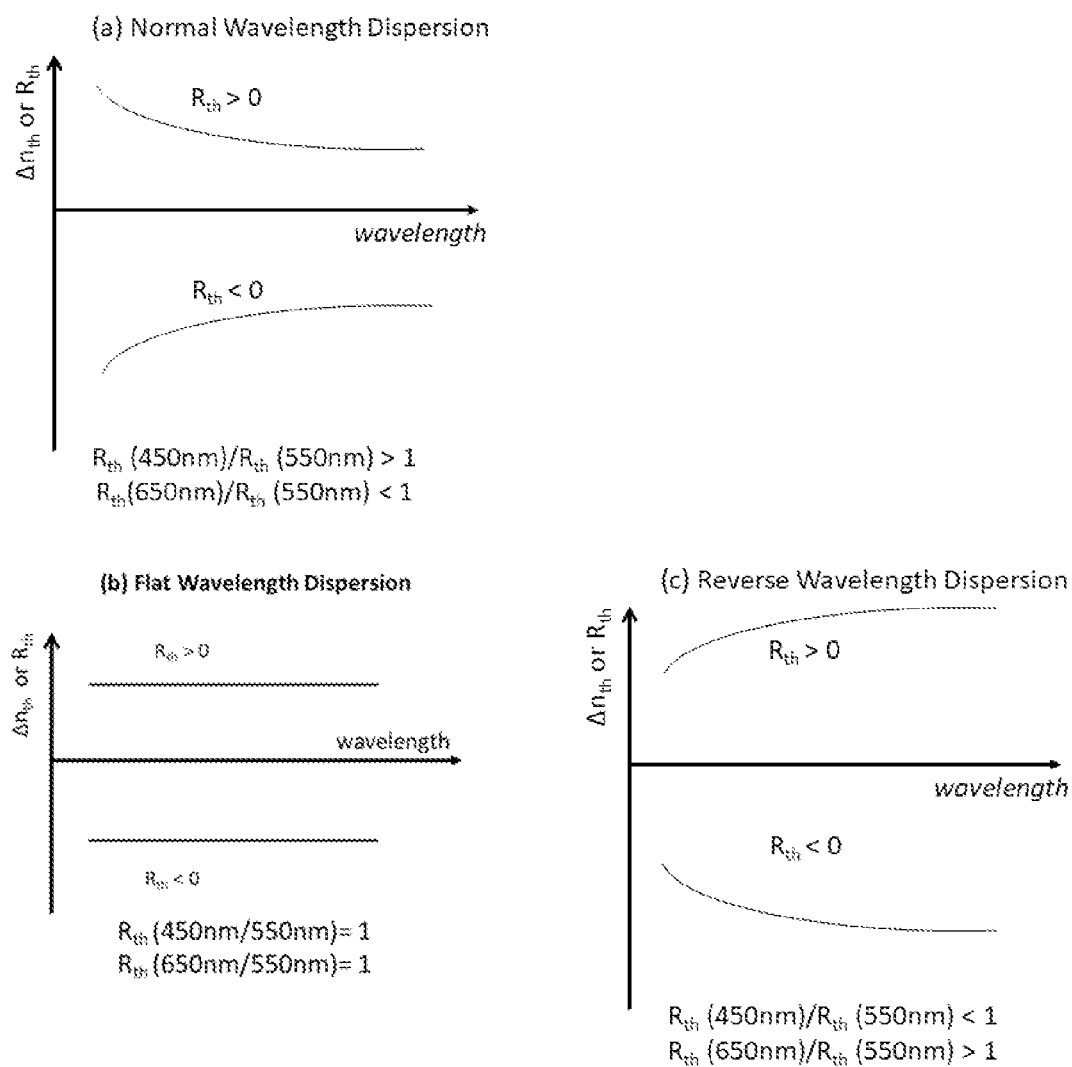

C+ films are one important category of compensation films. They are usually utilized to compensate light leakage of displays. In many cases, C+ films are used with other compensation films, such as A+ films, in a mufti-layer compensation films, In addition, wavelength dispersion is also important for compensation films. Wavelength dispersion relates to the relationship of birefringence or retardation with wavelength of light. $R_e(450 \text{ nm})/R_e(550 \text{ nm})$, $R_e(650 \text{ nm})/R_e(550 \text{ nm})$, $R_{th}(450 \text{ nm})/R_{th}(550 \text{ nm})$ and $R_{th}(650 \text{ nm})/R_{th}(550 \text{ nm})$, which indicates the ratio of retardation at 450 nm, 550 nm and 650 nm, are widely used to characterize the wavelength dispersion. As shown in FIG. 2, normal wavelength dispersion means the birefringence or retardation of compensation films is larger at shorter wavelength, a flat wavelength dispersion means the birefringence or retardation of compensation films is constant over the wavelength range studied, and revere wavelength dispersion means the birefringence or retardation of compensation films is smaller at shorter wavelength. Reverse wavelength dispersion is highly desired as it can significantly depress the color shift of displays.

Cellulose esters have been widely used for compensation films. They have many advantages compared to other materials such as polycarbonate and poly(cyclic olefins). The majority of cellulose esters based compensation films are made from cellulose esters with aliphatic acyl substituents, such as cellulose acetate, cellulose acetate propionate and cellulose acetate butyrate. The acyl substituents are randomly distributed. Those compensation films are usually C− films with $R_{th}$ or $\Delta n_{th}$ smaller than zero. Cellulose esters based C+ films can be achieved by adding aromatic acyl substituents and controlling the positions of the aromatic acyl substituents or long aliphatic acyl substituents to cellulose esters. Examples of C+ films based on regio-selectively substituted cellulose esters are reported in US20170306054 and U.S. application Ser. No. 62/891,591.

One problem with C+ compensation films made from cellulose esters is the normal wavelength dispersion of those compensation films with $R_e(450 \text{ nm})/R_e(550 \text{ nm}) > 1$ and $R_e(650 \text{ nm})/R_e(550 \text{ nm}) < 1$. There is no commercial C+ film product based on cellulose esters with flat or reverse wavelength dispersion.

In various embodiments, regioselectively substituted cellulose esters can be employed in which the aryl-acyl substituent is preferentially installed at C2 and C3 of the pyranose ring. Regioselectivity can be measured by determining the relative degree of substitution ("RDS") at C6, C3, and C2 in the cellulose ester by carbon 13 NMR spectroscopy (*Macromolecules*, 1991, 24, 3050-3059). In the case of one type of acyl substituent or when a second acyl substituent is present in a minor amount (DS<0.2), the RDS can be most easily determined directly by integration of the ring carbons. When 2 or more acyl substituents are present in similar amounts, in addition to determining the ring RDS, it is sometimes necessary to fully substitute the cellulose ester with an additional substituent in order to independently determine the RDS of each substituent by integration of the carbonyl carbons. In conventional cellulose esters, regioselectivity is generally not observed and the RDS ratio of C6/C3, C6/C2, or C3/C2 is generally near 1 or less. In essence, conventional cellulose esters are random copolymers. In contrast, when adding one or more acylating reagents to cellulose dissolved in an appropriate solvent, the C6 position of cellulose is acylated much faster than C2 and C3 positions. Consequently, the C6/C3 and C6/C2 ratios are significantly greater than 1, which is characteristic of a 6,3- or 6,2-enhanced regioselectively substituted cellulose ester.

Examples of regioselectively substituted cellulose esters and their methods for preparation are described in US20170306054 and US20170307796; the contents of which are hereby incorporated by reference. In general, these applications concern preparation of cellulose esters by dissolution of starting cellulose esters with low degree of substitution (DS) in dimethylacetamide (DMAC) and N-methylimidazole (NMI), which is then contacted with an acylating reagent. Accordingly, for various embodiments of the present invention, two general methods can be employed for preparing regioselectively substituted cellulose esters. In one method, regioselectively substituted cellulose esters can be prepared using a staged addition by first contacting the starting cellulose ester solution with one or more alkyl acylating reagents followed by contacting the cellulose solution with an aryl-acylating reagent at a contact temperature and contact time sufficient to provide a cellulose ester with the desired degree of substitution ("DS") and degree of polymerization ("DP"). In this staged addition, the acyl groups containing alkyl groups can be preferentially installed at C6 and the acyl groups containing an aryl group can be preferentially installed at C2 and/or C3. Alternatively, the regioselectively substituted cellulose esters can be prepared by contacting the starting cellulose ester solution with one or more alkyl acylating reagents followed by isolation of the alkyl ester in which the acyl groups containing alkyl groups are preferentially installed at C6. The alkyl ester can then be dissolved in any appropriate organic solvent and contacted with an aryl-acylating reagent which can preferentially install the acyl groups containing an aryl group at C2 and/or C3 at a contact temperature and contact time sufficient to provide a cellulose ester with the desired degree of substitution ("DS") and degree of polymerization ("DP"). The cellulose esters thus prepared generally comprise the following structure:

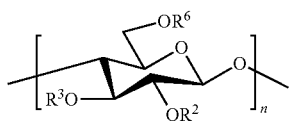

where $R^2$, $R^3$, and $R^6$ are hydrogen (with the proviso that $R^2$, $R^3$, and $R^6$ are not hydrogen simultaneously), alkyl-acyl groups, and/or aryl-acyl groups (such as those described above) bound to the cellulose via an ester linkage.

The degree of polymerization ("DP") of the cellulose esters prepared by these methods can be at least 10. In other embodiments, the DP of the cellulose esters can be at least 50, at least 100, or at least 250. In other embodiments, the DP of the cellulose esters can be in the range of from about 5 to about 100, or in the range of from about 10 to about 50.

Acylating reagents suitable for use herein can include, but are not limited to, alkyl or aryl carboxylic anhydrides, carboxylic acid halides, and/or carboxylic add esters containing the above-described alkyl or aryl groups suitable for use in the acyl substituents of the regioselectively substituted cellulose esters described herein. Examples of suitable carboxylic anhydrides include, but are not limited to, acetic anhydride, propionic anhydride, butyric anhydride, pivaloyl anhydride, benzoic anhydride, and naphthoyl anhydride, Examples of carboxylic acid halides include, but are not limited to, acetyl, propionyl, butyryl, pivaloyl, benzoyl, and naphthoyl chlorides or bromides, Examples of carboxylic acid esters include, but are not limited to, acetyl, propionyl, butyryl, pivaloyl, benzoyl and naphthoyl methyl esters. In one or more embodiments, the acylating reagent can be one or more carboxylic anhydrides selected from the group consisting of acetic anhydride, propionic anhydride, butyric anhydride, pivaloyl anhydride, benzoyl anhydride, and naphthoyl anhydride.

The present application discloses a film, comprising: (1) a
regioselectively substituted cellulose ester comprising: (i) a plurality of aromatic-CO— substituents; (ii) a plurality of a first unsaturated or saturated $(C_{1-6})$alkyl-CO— substituents; and (iii) a plurality of hydroxyl substituents; wherein: the degree of substitution for the hydroxyl ("$DS_{OH}$") is from 0 to 0.5, the degree of substitution for the aromatic-CO— substituent ("$DS_{ArCO}$") is from 0.8 to 1.6, the degree of substitution for the $(C_{1-6})$alkyl-CO— substituent ("$DS_{Ak}$") is from 0.9 to 2.2, and the aromatic-CO— is an $(C_{6-20})$aryl-CO—, wherein the aryl is unsubstituted or substituted by 1-5 $R^1$; and (2) a component A that is

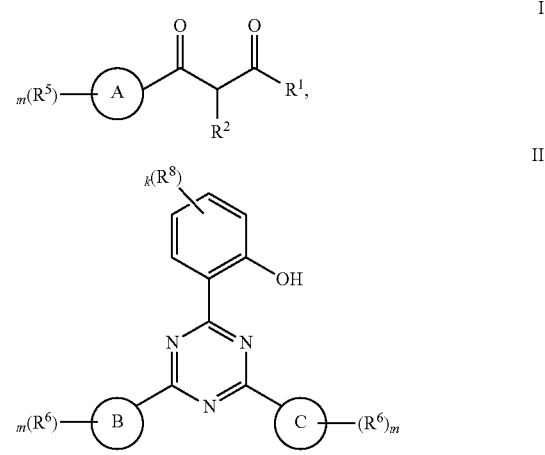

wherein: ring A is an $(C_{6-20})$aryl or a 5 to 10-membered heteroaryl containing 1-4 heteroatoms chosen from N, O, or S; ring B is $(C_{6-20})$aryl or a 5 to 10-membered heteroaryl containing 1-4 heteroatoms chosen from N, O, or S; ring C is $(C_{6-20})$aryl or a 5 to 10-membered heteroaryl containing 1-4 heteroatoms chosen from N, O, or S; $R^1$ is saturated or unsaturated $(C_{1-20})$ alkyl, saturated or unsaturated haloalkyl, saturated or unsaturated $(C_{1-20})$ alkoxy, $(C_{6-20})$aryl optionally by 1-5 substituted by saturated or unsaturated $(C_{1-20})$ alkyl, saturated or unsaturated halo$(C_{1-20})$alkyl, saturated or unsaturated $(C_{1-20})$alkoxy, saturated or unsaturated halo$(C_{1-20})$alkoxy, halo; 5 to 10-membered heteroaryl containing 1-4 heteroatoms chosen from N, O, or S; —CH$_2$C(O)—R$^3$; $R^2$ is independently hydrogen, saturated or unsaturated $(C_{1-20})$ alkyl, or saturated or unsaturated halo$(C_{1-20})$ alkyl; $R^3$ is saturated or unsaturated $(C_{1-20})$alkyl, saturated or unsaturated halo($C_{1-20}$)alkyl, ($C_{6-20}$)aryl, or 5 to 10-membered heteroaryl containing 1-4 heteroatoms chosen from N, O, or S, wherein the aryl or heteroaryl are unsubstituted or substituted by 1-5 $R^6$; $R^4$ is saturated or unsaturated ($C_{1-20}$) alkyl, saturated or unsaturated hetero($C_{1-20}$)alkyl containing 1-2 heteroatoms chosen from N, O, or S, saturated or unsaturated halo($C_{1-20}$)alkyl, saturated or unsaturated ($C_{1-20}$) alkoxy-($C_{1-20}$)alkyl, saturated or unsaturated ($C_{1-20}$) alkoxy-hydroxy($C_{1-20}$) alkyl, saturated or unsaturated ($C_{1-20}$)alkyl-CO—($C_{1-20}$)alkyl, saturated or unsaturated ($C_{1-20}$)alkyl-CO, saturated or unsaturated ($C_{1-20}$)alkyl-O—CO—$C_{(1-20)}$ alkyl, saturated or unsaturated ($C_{1-20}$)alkyl-COO—$C_{(1-20)}$alkyl, saturated or unsaturated ($C_{1-20}$)alkoxy-($C_{1-20}$)alkyl-COO—($C_{1-20}$)alkyl, saturated or unsaturated ($C_{1-20}$)alkoxy-($C_{1-20}$)alkyl-O—CO—($C_{1-20}$)alkyl, ($C_{6-10}$) aryl, 5- to 10-membered heteroaryl containing 1-4 heteroatoms selected from the group consisting of N, O, or S, wherein each of the groups is unsubstituted or substituted by 1-3 hydroxyl, saturated or unsaturated ($C_{1-20}$)alkyl, saturated or unsaturated halo($C_{1-20}$)alkyl, saturated or unsaturated ($C_{1-20}$)alkoxy, saturated or unsaturated halo($C_{1-20}$) alkoxy, saturated or unsaturated hydroxy($C_{1-20}$)alkyl, saturated or unsaturated ($C_{1-20}$)alkoxy-($C_{1-20}$)alkyl, saturated or unsaturated ($C_{1-20}$)alkoxy-hydroxy($C_{1-20}$)alkyl, saturated or unsaturated ($C_{1-20}$)alkoxy-($C_{1-20}$) alkyl-CO—($C_{1-20}$)alkyl, saturated or unsaturated ($C_{1-20}$)alkyl-CO, saturated or unsaturated ($C_{1-20}$)alkyl-COO, saturated or unsaturated ($C_{1-20}$)alkyl-O—CO—$C_{(1-20)}$ alkyl, saturated or unsaturated ($C_{1-20}$)alkyl-COO—$C_{(1-20)}$alkyl, saturated or unsaturated ($C_{1-20}$)alkoxy-($C_{1-20}$)alkyl-COO—($C_{1-20}$)alkyl, or ($C_{1-20}$)alkoxy-($C_{1-20}$) alkyl-O—CO—($C_{1-20}$)alkyl; each $R^5$ is independently hydroxy, cyano, saturated or unsaturated alkyl, saturated or unsaturated haloalkyl, saturated or unsaturated alkoxy, saturated or unsaturated haloalkoxy, or halo; each $R^6$ is independently hydroxy, cyano, saturated or unsaturated ($C_{1-20}$)alkyl, saturated or unsaturated halo($C_{1-20}$)alkyl, saturated or unsaturated ($C_{1-20}$)alkoxy, saturated or unsaturated halo($C_{1-20}$)alkoxy, saturated or unsaturated ($C_{1-20}$) alkyl-CO—, saturated or unsaturated ($C_{1-20}$alkyl-COO, saturated or unsaturated ($C_{1-20}$alkyl-O—CO—, saturated or unsaturated ($C_{1-20}$)alkyl-COO-alkyl, saturated or unsaturated ($C_{1-20}$)alkyl-O—CO—($C_{1-20}$)alkyl, or halo or ($C_{6-20}$) aryl, wherein the aryl is unsubstituted or substituted by 1-5 $R^7$; each $R^7$ is independently hydroxyl, saturated or unsaturated ($C_{1-6}$)alkyl, saturated or unsaturated halo($C_{1-6}$)alkyl, or saturated or unsaturated ($C_{1-6}$)alkoxy; each $R^8$ is $R^4$-O—, hydroxy, saturated or unsaturated ($C_{1-20}$)alkyl, saturated or unsaturated halo($C_{1-20}$)alkyl, saturated or unsaturated ($C_{1-20}$)alkyl-CO—($C_{1-20}$) alkyl, ($C_{1-20}$) alkenyl, ($C_{1-20}$)alkenyl-O, saturated or unsaturated ($C_{1-20}$) alkyl-COO—($C_{1-20}$)alkyl, saturated or unsaturated ($C_{1-20}$) alkyl-COO, saturated or unsaturated ($C_{1-20}$)alkyl-O—CO, saturated or unsaturated ($C_{1-20}$)alkyl-CO, saturated or unsaturated ($C_{1-20}$)alkoxy-($C_{1-20}$)alkyl-CO—O—($C_{1-20}$)alkyl, saturated or unsaturated ($C_{1-20}$)alkoxy-($C_{1-20}$)alkyl-O—CO—($C_{1-20}$)alkyl, saturated or unsaturated hetero($C_{1-20}$) alkyl, containing 1-2 heteroatoms chosen N, O, or S, ($C_{6-10}$)aryl, 5- to 10-membered heteroaryl containing 1-4 heteroatoms chosen from N, O, or S, wherein each of the groups are unsubstituted or substituted by 1-3 hydroxyl, saturated or unsaturated ($C_{1-20}$)alkyl, saturated or unsaturated halo($C_{1-20}$)alkyl, saturated or unsaturated ($C_{1-20}$) alkoxy, saturated or unsaturated halo($C_{1-20}$)alkoxy, saturated or unsaturated hydroxy($C_{1-20}$)alkyl, saturated or unsaturated ($C_{1-20}$)alkoxy-($C_{1-20}$)alkyl, saturated or unsaturated ($C_{1-20}$) alkoxy-hydroxy($C_{1-20}$)alkyl, or ($C_{1-20}$)alkoxy-($C_{1-20}$)alkyl-CO—($C_{1-20}$)alkyl, saturated or unsaturated ($C_{1-20}$)alkyl-CO, saturated or unsaturated ($C_{1-20}$)alkyl-COO, saturated or unsaturated ($C_{1-20}$)alkyl-O-CO—$C_{(1-20)}$alkyl, saturated or unsaturated ($C_{1-20}$)alkyl-COO—$C_{(1-20)}$alkyl, saturated or unsaturated ($C_{1-20}$) alkoxy-($C_{1-20}$)alkyl-COO—($C_{1-20}$)alkyl, or ($C_{1-20}$)alkoxy-($C_{1-20}$)alkyl-O—CO—($C_{1-20}$) alkyl; each m is 1, 2, 3, 4, or 5; and n is 1, 2, 3, 4, or 5; wherein: component A is present at less than 30 wt %, based on the total weight of the composition, the thickness of the film ("d") in microns is from 1 μm to 200 μm, the film exhibits a $R_e$(589 nm) that is in the range of −10 nm to 10 nm, the ratio of the $R_{th}$(589 nm) and d (nm) multiplied by $10^3$ is greater than 1.0, the $R_e$(589 nm) is the in-plane retardation measured at 589 nm, the $R_{th}$(589 nm) is the out-of-plane retardation measured at 589 nm.

In one embodiment or in combination with any other embodiment, the film is unstretched, In one embodiment or in combination with any other embodiment, the film is stretched. In one class of this embodiment, the film is biaxially stretched or uniaxially stretched.

In one embodiment or in combination with any other embodiment, $R^8$ is $R^4$—O—.

In one embodiment or in combination with any other embodiment, the film exhibits a $R_e$(589 nm) that is in the range −5 nm to 5 nm, wherein the $R_e$(589 nm) is the in-plane retardation measured at 589 nm. In one embodiment, the film exhibits a $R_e$(589 nm) that is in the range −1 nm to 1 nm, wherein the $R_e$(589 nm) is the in-plane retardation measured at 589 nm. In one embodiment, the film exhibits a $R_e$(589 nm) that is in the range 0.2 nm to 9 nm, wherein the $R_e$(589 nm) is the in-plane retardation measured at 589 nm.

In one embodiment or in combination with any other embodiment, the ratio of the $R_{th}$(589 nm) and the d (nm) multiplied by $10^3$ is greater than 2.0. In one embodiment or in combination with any other embodiment, the ratio of the $R_{th}$(589 nm) and d (nm) multiplied by $10^3$ is from 1.0 to 22. In one embodiment or in combination with any other embodiment, the ratio of the $R_{th}$(589 nm) and d (nm) multiplied by $10^3$ is from 1.0 to 10.

In one embodiment or hi combination with any other embodiment, the ratio of $R_{th}$(450 nm) to $R_{th}$(550 nm) is less than 1.05, wherein $R_{th}$(450 nm) is the out-of-plane retardation measured at 450 nm, and $R_{th}$(550 nm) is the out-of-plane retardation measured at 550 nm.

In one class of this embodiment, the ratio of $R_{th}$(650 nm) to $R_{th}$(550 nm) is greater 0.95, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (nm) multiplied by $10^3$ is from 1.0 to 22.

In one subclass of this class, the ratio of the $R_{th}$(589 nm) and d (nm) multiplied by $10^3$ is from 1.0 to 10.

In one class of this embodiment, the ratio of $R_{th}$(650 nm) to $R_{th}$(550 nm) is greater 1.0, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (nm) multiplied by $10^3$ is from 1.0 to 22.

In one subclass of this class, the ratio of the $R_{th}$(589 nm) and d (nm) multiplied by $10^3$ is from 1.0 to 10.

In one class of this embodiment, the ratio of $R_{th}$(650 nm) to $R_{th}$(550 nm) is from 1.0 to 1.25, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d 10multiplied by $10^3$ is greater than 2.0.

In one subclass of this class, the ratio of the $R_{th}$(589 nm) and d (nm) multiplied by $10^3$ is from 1.0 to 22, In one subclass of this class, the ratio of the $R_{th}$(589 nm) and d (nm) multiplied by $10^3$ is from 1.0 to 10.

In one embodiment or in combination with any other embodiment, the ratio of $R_{th}$(450 nm) to $R_{th}$(550 nm) is less than 1.0, wherein $R_{th}$(450 nm) is the out-of-plane retardation measured at 450 nm, and $R_{th}$(550 nm) is the out-of-plane retardation measured at 550 nm.

In one class of this embodiment, the ratio of $R_{th}$(650 nm) to $R_{th}$(550 nm) is greater 0.95, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (nm) multiplied by $10^3$ is from 1.0 to 22.

In one subclass of this class, the ratio of the $R_{th}$(589 nm) and d (n multiplied by $10^3$ is from 1.0 to 10.

In one class of this embodiment, the ratio of $R_{th}$(650 nm) to $R_{th}$(550 nm) is greater 1.0, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (nm) multiplied by $10^3$ is from 1.0 to 22.

In one subclass of this class, the ratio of the $R_{th}$(589 nm) and d (nm) multiplied by $10^3$ is from 1.0 to 10.

In one class of this embodiment, the ratio of $R_{th}$(650 nm) to $R_{th}$(550 nm) is from 1.0 to 1.25, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (nm) multiplied by $10^3$ is from 1.0 to 22.

In one subclass of this class, the ratio of the $R_{th}$(589 nm) and d (nm) multiplied by $10^3$ is from 1.0 to 10.

In one embodiment or in combination with any other embodiment, the ratio of $R_{th}$(450 nm) to $R_{th}$(550 nm) is less than 0.9, wherein $R_{th}$(450 nm) is the out-of-plane retardation measured at 450 nm, and $R_{th}$(550 rim) is the out-of-plane retardation measured at 550 nm.

In one class of this embodiment, the ratio of $R_{th}$(650 nm) to $R_{th}$(550 nm) is greater 0.95, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (n multiplied by $10^3$ is from 1.0 to 22.

In one subclass of this class, the ratio of the $R_{th}$(589 nm) and d (nm) multiplied by $10^3$ is from 1.0 to 10.

In one class of this embodiment, the ratio of $R_{th}$(650 nm) to $R_{th}$(550 nm) is greater 1.0, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (nm) multiplied by $10^3$ is from 1.0 to 22.

In one subclass of this class, the ratio of the $R_{th}$(589 nm) and d (nm) multiplied by $10^3$ is from 1.0 to 10.

In one class of this embodiment, the ratio of $R_{th}$(650 nm) to $R_{th}$(550 nm is from 1.0 to 1.25, wherein $R_{th}$(650 nm) is the out-of-plane retardation measured at 650 nm and $R_{th}$(550 nm) is the out-of-plane retardation measured at 550 nm.

In one subclass of this class, the ratio of the $R_{th}$(589 nm) and the d (nm) multiplied by $10^3$ is greater than 2.0.

In one subclass of this class, the ratio of the $R_{th}$(589 nm) and d (nm) multiplied by $10^3$ is from 1.0 to 22.

In one subclass of this class, the ratio of the $R_{th}$(589 nm) and d (nm) multiplied by $10^3$ is from 1.0 to 10.

In one embodiment or in combination with any other embodiment, the ratio of $R_{th}$(650 nm) to $R_{th}$(550 nm) is greater 0.95, wherein $R_{th}$(650 nm) is the out-of-plane retardation measured at 650 nm and $R_{th}$(550 nm) is the out-of-plane retardation measured at 550 nm.

In one embodiment or in combination with any other embodiment, the ratio of $R_{th}$(650 nm) to $R_{th}$(550 nm) is greater 1.0, wherein $R_{th}$(650 nm) is the out-of-plane retardation measured at 650 nm and $R_{th}$(550 nm) is the out-of-plane retardation measured at 550 nm.

In one embodiment or in combination with any other embodiment, the ratio of $R_{th}$(650 nm) to $R_{th}$(550 nm) is from 1.10 to 1.25, wherein $R_{th}$(650 nm) is the out-of-plane retardation measured at 650 nm and $R_{th}$(550 nm) is the out-of-plane retardation measured at 550 nm.

In one embodiment or in combination with any other embodiment, the aromatic-CO— is an $(C_{6-20})$aryl-CO—, wherein the aryl is unsubstituted or substituted by 1-5 $R^1$. In one class of this embodiment, the aromatic-CO— is benzoyl or naphthoyl, which is unsubstituted or substituted by 1-5 $R^1$. In one class of this embodiment, the aromatic-CO— is benzoyl, unsubstituted or substituted by 1-5 $R^1$. In one class of this embodiment, the aromatic-CO— is naphthoyl, unsubstituted or substituted by 1-5 $R^1$.

In one embodiment or in combination with any other embodiment, the aromatic-CO— is benzoyl or naphthoyl, unsubstituted or substituted by 1-5 $R^1$. In one class of this embodiment, the cellulose ester has a total $DS_{ArCO}$ of from 0.8 to 1.5. In one class of this embodiment, the cellulose ester has a total $DS_{ArCO}$ of from 0.8 to 1.2. In one class of this embodiment, the cellulose ester has a total $DS_{ArCO}$ of from 1.2 to 1.5.

In one embodiment or in combination with any other embodiment, the aromatic-CO— is benzoyl, unsubstituted or substituted by 1-5 $R^1$. In one class of this embodiment, the cellulose ester has a total $DS_{ArCO}$ of from 0.8 to 1.5. In one class of this embodiment, the cellulose ester has a total $DS_{ArCO}$ of from 0.8 to 1.2. In one class of this embodiment, the cellulose ester has a total $DS_{ArCO}$ of from 1.2 to 1.5.

In one embodiment or in combination with any other embodiment, the aromatic-CO— is naphthoyl, unsubstituted or substituted by 1-5 $R^1$. In one class of this embodiment, the cellulose ester has a total $DS_{ArCO}$ of from 0.8 to 1.5. In one class of this embodiment, the cellulose ester has a total $DS_{ArCO}$ of from 0.8 to 1.2. In one class of this embodiment, the cellulose ester has a total $DS_{ArCO}$ of from 1.2 to 1.5.

In one embodiment or in combination with any other embodiment, the celluloses ester has a degree of substitution for first unsaturated or saturated $(C_{1-6})$alkyl-acyl substituent ("$DS_{FAk}$") that is from 0.7 to 2.2. In one embodiment, the celluloses ester has a degree of substitution for first unsaturated or saturated $(C_{1-6})$alkyl-acyl substituent ("$DS_{FAk}$") that is from 0.7 to 1.9.

In one class of this embodiment, the first unsaturated or saturated $(C_{1-20})$ alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or crotonyl. In one class of this embodiment, the first unsaturated or saturated $(C_{1-6})$alkyl-CO— substituent is acetyl, propionyl, or crotonyl.

In one embodiment or in combination with any other embodiment, the cellulose ester further comprises a plurality of a second $(C_{1-20})$alkyl-CO-substituent. In one class of this embodiment, the degree of substitution for the second $(C_{1-20})$alkyl-CO— substituent ("$DS_{S4k}$") is from 0.05 to 0.6.

In one class of this embodiment, the second $(C_{1-20})$alkyl-CO-substituent is acetyl, propionyl, butyryl, isobutyryl, 3-methylbutanoyl, pentanoyl, 4-methylpentanoyl, 3-methylpentanoyl, 2-methylpentanoyl, hexanoyl, or 2-ethylhexanoyl. In one class of this embodiment, the second $(C_{1-20})$alkyl-CO-substituent is acetyl, isobutyryl, 3-methylbutanoyl, pentanoyl, 4-methylpentanoyl, 3-methylpentanoyl, 2-methylpentanoyl, hexanoyl, or 2-ethylhexanoyl. In one class of this embodiment, the second $(C_{1-20}$alkyl-CO-substituent is acetyl or 2-ethylhexanoyl.

In one embodiment or in combination with any other embodiment, the aromatic-CO— is naphthoyl, unsubstituted or substituted by 1-5 $R^1$. In one embodiment, the aromatic-CO— is naphthoyl.

In one embodiment or in combination with any other embodiment, the component A is

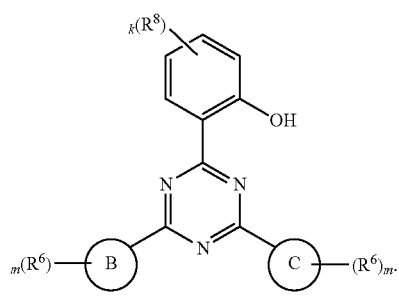

II

In one class of this embodiment, $R^8$ is $R^4$—O—. In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is

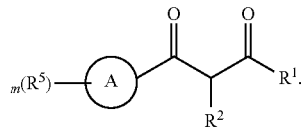

I

In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is 1,3-diphenyl-1,3-propanedione, avobenzone, 2-(4,6-diphenyl-1,3,5-triazin-2-yl)-5-(hexyloxy)phenol (Tinuvin 1577), isooctyl 2-(4-(4,6-di([1,1'-biphenyl]-4-yl)-1,3,5-triazin-2-yl)-3-hydroxyphenoxy)propanoate (Tinuvin 479), 6,6'-(6-(2,4-dibutoxyphenyl)-1,3,5-triazine-2,4-diyl)bis(3-butoxyphenol) (Tinuvin 460), or combinations thereof. In one class of this embodiment, the component A is present at greater than 1 wt %. In one class of this embodiment, the component A is present in the range of from 1 wt , to 30 wt %. In one class of this embodiment, the component A is present in the range of from 1 wt % to 20 wt %. In one class of this embodiment, the component A is present hi the range of from 1 wt % to 15 wt %.

In one embodiment or in combination with any other embodiment, the component A is 1,3-diphenyl-1,3-propanedione. In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is avobenzone. In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is 2-(4,6-diphenyl-1,3,5-triazin-2-yl)-5-(hexyloxy)phenol (Tinuvin 1577). In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is isooctyl 2-(4-(4,6-di([1,1'-biphenyl]-4-yl)-1,3,5-triazin-2-yl)-3-hydroxyphenoxy)propanoate (Tinuvin 479). In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is 6,6'-(6-(2,4-dibutoxyphenyl)-1,3,5-triazine-2,4-diyl)bis(3-butoxyphenol). In one class of this embodiment, the component A is present at greater than 1 wt %. In one class of this embodiment, the component A is present in the range of from 1 wt % to 30 wt %. In one class of this embodiment, the component A is present in the range of from 1 wt % to 20 wt %. In one class of this embodiment, the component A is present in the range of from 1 wt % to 15 wt %.

In one embodiment or in combination with any other embodiment, the component A is present at less than 20 wt %. In one embodiment or in combination with any other embodiment, the component A is present at greater than 1 wt %. In one embodiment or in combination with any other embodiment, the component A is present at greater than 2.5 wt %. In one embodiment or in combination with any other embodiment, the component A is present in the range of from 1 wt % to 30 wt %. In one embodiment or in combination with any other embodiment, the component A is present in the range of from 2.5 wt % to 30 wt %. In one embodiment or in combination with any other embodiment, the component A is present in the range of from 5 wt % to 30 wt %. In one embodiment or in combination with any other embodiment, the component A is present in the range of from 2.5 wt % to 25 wt %. In one embodiment or in combination with any other embodiment, the component A is present in the range of from 1 wt % to 20 wt %. In one embodiment or in combination with any other embodiment, the component A is present hi the range of from 1 wt % to 18 wt %. In one embodiment or in combination with any other embodiment, the component A is present in the range of from 1 wt % to 15 wt %. In one embodiment or in combination with any other embodiment, the component A is present in the range of from 1 wt % to 10 wt %.

In one embodiment or in combination with any other embodiment, m is 1. In one embodiment or in combination with any other embodiment, m is 2. In one embodiment, m is 3. In one embodiment or in combination with any other embodiment, m is 4. In one embodiment or in combination with any other embodiment, m is 5. In one embodiment or in combination with any other embodiment, m is 1, 2, 3, or 4. In one embodiment or in combination with any other embodiment, m is 1. 2, or 3. In one embodiment or in combination with any other embodiment, m is 1, or 2.

In one embodiment or in combination with any other embodiment, n is 1. In one embodiment or in combination with any other embodiment, n is 2. In one embodiment or in combination with any other embodiment, n is 3. In one embodiment or in combination with any other embodiment, n is 4. In one embodiment or in combination with any other embodiment, n is 5. In one embodiment, n is 1, 2, 3, or 4. In one embodiment or in combination with any other embodiment, n is 1, 2, or 3. In one embodiment or in combination with any other embodiment, n is 1, or 2.

Specific Embodiments

Embodiment 1. A film, comprising: (1) a regioselectively substituted cellulose ester comprising: (i) a plurality of aromatic-CO— substituents; (ii) a plurality of a first unsaturated or saturated $(C_{1-6})$alkyl-CO— substituents; and (iii) a plurality of hydroxyl substituents; wherein: the degree of substitution for the hydroxyl ("$DS_{OH}$") is from 0 to 0.5, the degree of substitution for the aromatic-CO— substituent ("$DS_{ArCO}$") is from 0.8 to 1:6, the degree of substitution for the $(C_{1-6})$alkyl-CO— substituent ("$DS_{Ak}$") is from 0.9 to 2.2, and the aromatic-CO— is an $(C_{6-20})$aryl-CO—, wherein the aryl is unsubstituted or substituted by 1-5 $R^1$; and (2) a component A that is

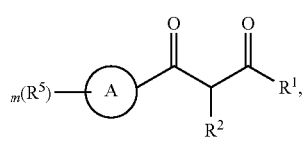

I

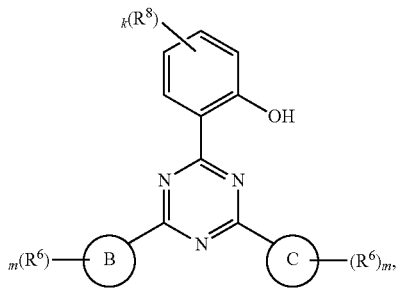

II wherein: ring A is an $(C_{6-20})$aryl or a 5 to 10-membered heteroaryl containing 1-4 heteroatoms chosen from N, O, or S; ring B is $(C_{6-20})$aryl or a 5 to 10-membered heteroaryl containing 1-4 heteroatoms chosen from N, O, or S; ring C is $(C_{6-20})$aryl or a 5 to 10-membered heteroaryl containing 1-4 heteroatoms chosen from N, O, or S; $R^1$ is saturated or unsaturated $(C_{1-20})$ alkyl, saturated or unsaturated haloalkyl, saturated or unsaturated $(C_{1-20})$ alkoxy, $(C_{6-20})$aryl optionally by 1-5 substituted by saturated or unsaturated $(C_{1-20})$ alkyl, saturated or unsaturated halo$(C_{1-20})$alkyl, saturated or unsaturated $(C_{1-20})$alkoxy, saturated or unsaturated halo$(C_{1-20})$alkoxy, halo; 5 to 10-membered heteroaryl containing 1-4 heteroatoms chosen from N, O, or S; —$CH_2C(O)$—$R^3$; $R^2$ is independently hydrogen, saturated or unsaturated $(C_{1-20})$ alkyl, or saturated or unsaturated halo$(C_{1-20})$ alkyl; $R^3$ is saturated or unsaturated $(C_{1-20})$alkyl, saturated or unsaturated halo$(C_{1-20})$alkyl, $(C_{6-20})$aryl, or 5 to 10-membered heteroaryl containing 1-4 heteroatoms chosen from N, O, or S, wherein the aryl or heteroaryl are unsubstituted or substituted by 1-5 $R^6$; $R^4$ is saturated or unsaturated $(C_{1-20})$ alkyl, saturated or unsaturated hetero$(C_{1-20})$alkyl containing 1-2 heteroatoms chosen from N, O, or S, saturated or unsaturated halo$(C_{1-20})$alkyl, saturated or unsaturated $(C_{1-20})$ alkoxy-$(C_{1-20})$alkyl, saturated or unsaturated $(C_{1-20})$ alkoxy-hydroxy$(C_{1-20})$ alkyl, saturated or unsaturated $(C_{1-20})$alkyl-CO—$(C_{1-20})$alkyl saturated or unsaturated $(C_{1-20})$alkyl-CO, saturated or unsaturated $(C_{1-20})$alkyl-O—CO—$C_{(1-20)}$ alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, saturated or unsaturated $(C_{1-20})$alkoxy-$(C_{1-20})$alkyl-O—CO—$(C_{1-20})$alkyl, $(C_{6-10})$ aryl, 5- to 10-membered heteroaryl containing 1-4 heteroatoms selected from the group consisting of N, O, or S, wherein each of the groups is unsubstituted or substituted by 1-3 hydroxyl, saturated or unsaturated $(C_{1-20})$alkyl, saturated or unsaturated halo$(C_{1-20})$alkyl, saturated or unsaturated $(C_{1-20})$alkoxy, saturated or unsaturated halo$(C_{1-20})$ alkoxy, saturated or unsaturated hydroxy$(C_{1-20})$alkyl, saturated or unsaturated $(C_{1-20})$alkoxy-$(C_{1-20})$alkyl, saturated or unsaturated $(C_{1-20})$alkoxy-hydroxy$(C_{1-20})$alkyl, saturated or unsaturated $(C_{1-20})$alkoxy-$(C_{1-20})$ alkyl-CO—$(C_{1-20})$alkyl, saturated or unsaturated $(C_{1-20})$alkyl-CO, saturated or unsaturated $(C_{1-20})$alkyl-COO, saturated or unsaturated $(C_{1-20})$alkyl-O—CO—$C_{(1-20)}$ alkyl, saturated or unsaturated $(C_{1-20})$alkyl-COO—$C_{(1-20)}$alkyl, saturated or unsaturated $(C_{1-20})$alkoxy-$(C_{1-20})$alkyl-COO—$(C_{1-20})$alkyl, or $(C_{1-20})$alkoxy-$(C_{1-20})$ alkyl-O—CO—$(C_{1-20})$alkyl; each $R^5$ is independently hydroxy, cyano, saturated or unsaturated alkyl, saturated or unsaturated haloalkyl, saturated or unsaturated alkoxy, saturated or unsaturated haloalkoxy, or halo; each $R^6$ is independently hydroxy, cyano, saturated or unsaturated $(C_{1-20})$alkyl, saturated or unsaturated halo($C_{1-20}$)alkyl, saturated or unsaturated ($C_{1-20}$)alkoxy, saturated or unsaturated halo($C_{1-20}$)alkoxy, saturated or unsaturated ($C_{1-20}$) alkyl-CO—, saturated or unsaturated ($C_{1-20}$)alkyl-COO, saturated or unsaturated ($C_{1-20}$)alkyl-O—CO—, saturated or unsaturated ($C_{1-20}$)alkyl alkyl, saturated or unsaturated ($C_{1-20}$)alkyl-O—CO—($C_{1-20}$)alkyl, or halo or ($C_{6-20}$) aryl, wherein the aryl is unsubstituted or substituted by 1-5 $R^7$; each $R^7$ is independently hydroxyl, saturated or unsaturated ($C_{1-6}$)alkyl, saturated or unsaturated halo($C_{1-6}$)alkyl, or saturated or unsaturated ($C_{1-6}$)alkoxy; each $R^8$ is $R^4$—O—, hydroxy, saturated or unsaturated ($C_{1-20}$)alkyl, saturated or unsaturated halo($C_{1-20}$)alkyl, saturated or unsaturated ($C_{1-20}$)alkyl-CO—($C_{1-20}$) alkyl, ($C_{1-20}$) alkenyl, ($C_{1-20}$)alkenyl-O, saturated or unsaturated ($C_{1-20}$) alkyl-COO—($C_{1-20}$)alkyl, saturated or unsaturated ($C_{1-20}$) alkyl-COO, saturated or unsaturated ($C_{1-20}$)alkyl-O—CO, saturated or unsaturated ($C_{1-20}$)alkyl-CO, saturated or unsaturated ($C_{1-20}$)alkoxy-($C_{1-20}$)alkyl-CO—O—($C_{1-20}$)alkyl, saturated or unsaturated ($C_{1-20}$)alkoxy-($C_{1-20}$)alkyl-O—CO—($C_{1-20}$)alkyl, saturated or unsaturated hetero($C_{1-20}$) alkyl, containing 1-2 heteroatoms chosen N, O, or S, ($C_{6-10}$)aryl, 5- to 10-membered heteroaryl containing 1-4 heteroatoms chosen from N, O, or S, wherein each of the groups are unsubstituted or substituted by 1-3 hydroxyl, saturated or unsaturated ($C_{1-20}$)alkyl, saturated or unsaturated halo($C_{1-20}$)alkyl, saturated or unsaturated ($C_{1-20}$) alkoxy, saturated or unsaturated halo($C_{1-20}$)alkoxy, saturated or unsaturated hydroxy($C_{1-20}$)alkyl, saturated or unsaturated ($C_{1-20}$)alkoxy-($C_{1-20}$)alkyl, saturated or unsaturated ($C_{1-20}$) alkoxy-hydroxy($C_{1-20}$)alkyl, or ($C_{1-20}$)alkoxy-($C_{1-20}$)alkyl-CO—($C_{1-20}$)alkyl, saturated or unsaturated ($C_{1-20}$)alkyl-CO, saturated or unsaturated ($C_{1-20}$)alkyl-COO, saturated or unsaturated ($C_{1-20}$)alkyl-O—CO—C($_{1-20}$)alkyl, saturated or unsaturated ($C_{1-20}$)alkyl-COO—C($_{1-20}$)alkyl, saturated or unsaturated ($C_{1-20}$) alkoxy-($C_{1-20}$)alkyl-COO—($C_{1-20}$)alkyl, or ($C_{1-20}$)alkoxy-($C_{1-20}$)alkyl-O—CO—($C_{1-20}$) alkyl; each m is 1, 2, 3, 4, or 5; and n is 1, 2, 3, 4, or 5; wherein: component A is present at less than 30 wt %, based on the total weight of the composition, the thickness of the film ("d") in microns is from 1 μm to 200 μm, the film exhibits a $R_e$(589 nm) that is in the range of −10 nm to 10 nm, the ratio of the $R_{th}$(589 nm) and d (nm) multiplied by $10^3$ is greater than 1.0, the $R_e$(589 nm) is the in-plane retardation measured at 589 nm, the $R_{th}$(589 nm) is the out-of-plane retardation measured at 589 nm.

Embodiment 2. A film, comprising: (1) a regioselectively substituted cellulose ester comprising: (i) a plurality of aromatic-CO— substituents; (ii) a plurality of a first unsaturated or saturated ($C_{1-6}$)alkyl-CO— substituents; and (iii) a plurality of hydroxyl substituents; wherein: the degree of substitution for the hydroxyl ("$DS_{OH}$") is from 0 to 0.5, the degree of substitution for the aromatic-CO— substituent ("$DS_{ArCO}$") is from 0.8 to 1.6, the degree of substitution for the ($C_{1-6}$)alkyl-CO— substituent ("$DS_{Ak}$") is from 1.1-2.2, and the aromatic-CO— is an ($C_{6-20}$)aryl-CO—, wherein the aryl is unsubstituted or substituted by 1-5 $R^1$; and (2) a component A that is

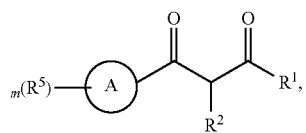

I

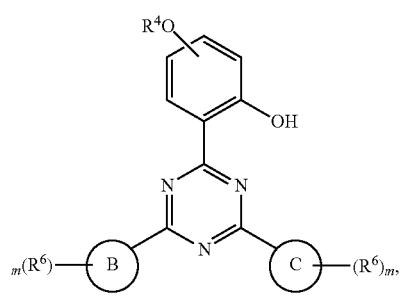

II wherein: ring A is an ($C_{6-20}$)aryl or a 5 to 10-membered heteroaryl containing 1-4 heteroatoms chosen from N, O, or S; ring B is ($C_{6-20}$)aryl, ring C is ($C_{6-20}$) aryl; $R^1$ is alkyl, haloalkyl, ($C_{6-20}$)aryl optionally by 1-5 substituted by alkyl, haloalkyl, alkoxy, haloalkoxy, halo; 5 to 10-membered heteroaryl containing 1-4 heteroatoms chosen from N, O, or S; —$CH_2C(O)$—$R^3$; $R^2$ is independently hydrogen, alkyl, or haloalkyl; $R^3$ is alkyl, haloalkyl, ($C_{6-20}$)aryl, or 5 to 10-membered heteroaryl containing 1-4 heteroatoms chosen from N, O, or S, wherein the aryl or heteroaryl are unsubstituted or substituted by 1-5 $R^6$; $R^4$ is ($C_{1-20}$)alkyl, halo($C_{1-20}$)alkyl, ($C_{1-20}$)alkyl-CO—($C_{1-20}$)alkyl, each unsubstituted or substituted by 1-3 hydroxyl, ($C_{1-20}$)alkoxyl, or halo($C_{1-20}$)alkoxyl. hydroxy($C_{1-20}$) alkyl, ($C_{1-20}$)alkoxy-($C_{1-20}$)alkyl, ($C_{1-20}$)alkoxy-hydroxy($C_{1-20}$)alkyl, or ($C_{1-20}$) alkoxy-($C_{1-20}$)alkyl-CO—($C_{1-20}$)alkyl-; each $R^5$ is independently hydroxy, cyano, alkyl, haloalkyl, alkoxy, haloalkoxy, or halo; each $R^6$ is independently hydroxy, cyano, alkyl, haloalkyl, alkoxy, haloalkoxy, or halo or ($C_{6-20}$)aryl, wherein the aryl is unsubstituted or substituted by 1-5 $R^7$; each $R^7$ is independently hydroxyl, ($C_{1-6}$)alkyl, halo($C_{1-6}$) alkyl, or ($C_{1-6}$)alkoxyl; each m is 1, 2, 3, 4 or 5; n is 1, 2, 3, 4, or 5, wherein: component A is present at less than 30 wt %, based on the total weight of the composition, the thickness of the film ("d") in microns is from 1 μm to 200 μm, the film exhibits a $R_e$(589 nm) that is in the range of −10 nm to 10 nm, the ratio of the $R_{th}$(589 nm) and d (nm) multiplied by $10^3$ is greater than 1.0, the $R_e$(589 nm) is the in-plane retardation measured at 589 nm, the $R_{th}$(589 nm) is the out-of-plane retardation measured at 589 nm.

Embodiment 3. The film of any one of Embodiments 1 or 2, wherein the ratio of $R_{th}$(450 nm) to $R_{th}$(550 nm) is less than 1.05, wherein $R_{th}$(450 nm) is the out-of-plane retardation measured at 450 nm, and $R_{th}$(550 nm) is the out-of-plane retardation measured at 550 nm.

Embodiment 4. The film of any one of Embodiments 1 or 2, wherein the ratio of $R_{th}$(450 nm) to $R_{th}$(550 nm) is from 0.75 to 0.85.

Embodiments 5. The film of any one of Embodiments 1-4, wherein ratio of $R_{th}$(650 nm) to $R_{th}$(550 nm) is greater than 0.95, wherein the $R_{th}$(650 nm) is the out-of-plane retardation measured at 650 nm and $R_{th}$(550 nm) is the out-of-plane retardation measured at 550 nm.

Embodiment 6. The film of embodiment 5, wherein ratio of $R_{th}$(650 nm) to $R_{th}$(550 nm) is from 1.10 to 1.25.

Embodiment 7. The film of any one of Embodiments 1-6, wherein the component A is 1,3-diphenyl-1,3-propanedione, avobenzone; 2-(4,6-diphenyl-1,3,5-triazin-2-yl)-5-(hexyloxy)phenol, isooctyl 2-(4-4,6-di([1,1'-biphenyl]-4-yl)-1,3,5-triazin-2-yl)-3-hydroxyphenoxy)propanoate, 6,6'-(6-(2,4-dibutoxyphenyl)-1,3,5-triazine-2,4-diyl)bis(3-butoxyphenol), or combinations thereof.

Embodiment 8. The film of any one of Embodiments 1-7, wherein component A is present at less than 20 wt %.

Embodiment 9. The film of Embodiments 1-8, wherein the aromatic-CO— is benzoyl or naphthoyl, unsubstituted or substituted by 1-5 $R^1$.

Embodiment 10. the film of any one of Embodiments 1-8, wherein the first unsaturated or saturated $(C_{1-20})$alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or crotonyl.

Embodiment 11. The film of any one of Embodiment 1-10, wherein the cellulose ester further comprises a plurality of a second $(C_{1-20})$alkyl-CO— substituent.

Embodiment 12. The film of any one of Embodiments 1-11, wherein the second $(C_{1-20})$alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or 2-ethylhexanoyl.

EXAMPLES

Abbreviations

1MIM: 1-methylimidazole, 2EH or 2-EH: 2-ethylhexanoyl; 2EHCl: 2-ethylhexanoyl chloride; AcOH: acetic acid; Ak: alkyl acyl or alkyl-CO—; Ar: aryl; ArCO; arylacyl or aryl-CO—; atm: atmosphere; Bz: benzoyl; BzCl: benzoyl chloride; ° C: degree(s) Celsius; C2DS: average degree substitution at the C2 position of the anhydroglucose unit; C3DS: the average degree of substitution at the C3 position of the anhydroglucose unit; C6DS: the average degree of substitution at the C6 position of the anhydroglucose unit; CE: cellulose ester(s); CPN: cyclopentanone; CPr: propionyl substituted cellulose ester or cellulose propionate; CPr2EH: propionyl and 2-ethylhexanoyl substituted cellulose ester or cellulose propionate 2-ethylhexanoate; CPr2EHBz: propionyl, 2-ethylhexanoyl and benzoyl substituted cellulose ester or cellulose propionate 2-ethylhexanoate benzoate; CPr2EHNp: propionyl, 2-ethylhexanoyl and naphthoyl substituted cellulose ester or cellulose 2-ethylhexanoate naphthoate; CPrPvNp; propionyl, Pivaloyl and naphthoyl substituted cellulose ester or cellulose propionate pivalate naphthoate; DCM: dichloromethane; DEP: diethyl phthalate; GMAC; dimethyl acetamide; DMSO: Dimethyl sulfoxide; DPDO: 1,3-diphenylpropane-1,3-dione; DS: average degree substitution; eq: equivalent(s); EtOH: ethanol; Ex: example(s); FAk: first alkyl-acyl or first alkyl-CO—; SAk: second alkyl-acyl or second alkyl-CO—; FAr: first aryl-acyl or first aryl-CO—; g: gram; Int: intermediate; i-PrOH or iPrOH: iso-propanol; KOAc: potassium acetate; MER: methyl ethyl ketone; MeOH: methanol; MIPK: methyl isopropyl ketone; g: is gram; hr or h: hour(s); L: liter; min: minute(s); mL: milliliter; μm: micrometer or micron; mol; mole(s); NMI is N-methylimidazole; NMR: nuclear magnetic resonance; Np: naphthoyl; NpCl: 2-naphthoyl chloride; Pr: propionyl; RBF: round bottom flask; RM: reaction mixture; rt: room temperature; SAr: second aryl-acyl or second aryl-CO—; Tot.: total; TFA: trifluoroacetic acid; TFAA: trifluoroacetic anhydride.

NMR Characterization: Proton NMR data were obtained on a JEOL Model Eclipse-600 NMR spectrometer operating at 600 MHz. The sample tube size was 5 mm, and the sample concentrations were ca, 20 mg/mL DMSO-$d_6$. Each spectrum was recorded at 80° C. using 64 scans and a 15 second pulse delay. One to two drops of trifluoroacetic acid-d were added to each sample to shift residual water from the spectral region of interest, Chemical shifts are reported in parts per million ("ppm") from tetramethylsilane with the center peak of DMSO-$d_6$ as an internal reference (2.49 ppm).

Quantitative $^{13}$C NMR data were obtained on a JEOL Model GX-400 NMR spectrometer operating at 100 MHz. The sample tube size was 10 mm, and the sample concentrations were ca. 100 mg./mL DMSO-d6. Chromium(III) acetylacetonate was added to each sample at 5 mg/100 mg cellulose ester as a relaxation agent. Each spectrum was typically recorded at 80° C. using 10000 scans and a 1 second pulse delay. Chemical shifts are reported in ppm from tetramethylsilane with the center peak of DMSO-$d_6$ as an internal reference (39.5 ppm), The proton and carbon NMR assignments, the degree of substitution and the relative degree of substitution ("RDS") of the various acyl groups of the cellulose esters were determined by adapting the procedures disclosed in US 2012/0262650, DMTA measurements were run DMA Q800 from TA Instruments with isothermal temperature set for 5 min followed by temperature ramp from 25° C. to 230° C. at 3° C./min. The oscillation strain was set at 0.1%.

The solutions of the cellulose esters for preparation of the films and the film preparation were made by adapting the procedures disclosed in US 2012/0262650.

Dope Solution preparation for film casting: cellulose ester solids and additives were added to solvent to give a final concentration of 8-16 wt % based on the total weight of cellulose ester and plasticizers. The mixture was sealed, placed on a roller, and mixed for 24 h to create a uniform solution Solvent used for solution preparation can be but not limited to CPN, MEK, DCM/acetone=90/10 (wt/wt), DCM/MeOH=90/10 (wt/wt), DCM/MeOH=95/5 (wt/wt), DCM/EtOH=90/10 (wt/wt), DCM/EtOH=95/5 (wt/wt), and MEK/MIPK=20/80 (wt/wt).

Film casting: For films (1.1-1.9, 2,1), the solution prepared above was cast onto a thin glass plate using a doctor blade to obtain a film with the desired thickness, Casting was conducted in a fume hood with relative humidity controlled at 45%~50%. After casting, if DOM/acetone=90/10 (wt/wt), DCM/EtOH=90/10 (wt/wt), DCM/EtOH=95/5 (wt/wt), DCM/MeOH=90/10 (wt/wt), DCM/MeOH=95/5 (wt/wt) was used as solvent, unless otherwise noted, the film was allowed to dry for 45 min under a cover pan to minimize rate of solvent evaporation before the pan was removed. The film was allowed to dry for 15 min with the pan removed. The film was left on the glass substrate and annealed in a forced air oven for 10 min at 100° C. If MEK or MEK/MIPK=20180 (wt/wt) was used as solvent, unless otherwise noted, the film was dried in oven at 85° C. for 15 min and annealed in a forced air oven for 10 minutes at 100° C. The films were measured on 9 sections. For films 3.1, 4.1, 4.2, 5.1, 5.2, 6.1, 6.2, 7.1, and 7.2 the dopes prepared above were cast onto a glass plate using a doctor blade to obtain a film with the desired thickness. Casting was conducted in a fume hood with relative humidity controlled at 45%~50%. The film was allowed to dry for 60 min under a cover pan to minimize rate of solvent evaporation before the pan was removed. The film was allowed to dry for 15 min with the pan removed, then the film was peeled from the glass and annealed in a forced air oven for 10 min at 100° C.

Optical measurements: Film optical retardation and dispersion measurements were made using a J. A. Woollam M-2000V Spectroscopic Ellipsometer having a spectral range from 370 to 1000 nm or J. A.Woollam RC2 Ellipsometer having a spectral range from 250-2500 nm. Ret- Meas (Retardation Measurement) program from J. A. Woollam Co., Inc. was used to obtain optical film in-plane ($R_e$) and out-of-plane ($R_{th}$) retardations. The thickness of the films was measured using a Metricon Prism Coupler 2010 (Metricon Corp.) or using a handheld Positector 6000. The haze and b* measurements were made using a HunterLab Ultrascan VIS colorimeter in diffused transmittance mode (1-inch diameter port).

Chemicals: 1,3-diphenylpropane-1,3-dione was purchased from Millipore Sigma, Avobenzone was purchased from Tokyo Chemical Industry Co., Ltd. (TCI), Tinuvin 1577 were purchased from Ciba Specialty Chemical Corp., and Tinuvin 479 were purchased from BASF.

Intermediate 1 (CPr, $DS_{pr}$=1.13)

To a 4-neck RBF, under a $N_2$ atm with overhead stirring and a bottom valve, was added IPrOH (259 g). The jacket was set at 41° C. To the reactor was added Eastman™ CAP 482-20 (60 g), and the RM was stirred for 40 min. To the RM was added $N_2H_4 \cdot H_2O$ (18.0 g, 1.89 eq) in AcOH (4.63 g, 0.41 eq) and DMSO (259 g). The RM was stirred for 24 hr. The crude product was precipitated by the addition of water, The crude product was filtered with a wash bag and washed with copious amounts of water. The solid was transferred to an aluminum pan and dried in vacuo (60° C.) overnight to give the title compound. $^1$H NMR, $^{13}$C NMR: $DS_{pr}$=1.13, $DS_{OH}$=1.87, C2DS=0.26. C3DS=0.34, C6DS=0.53.

Intermediate 2 (CPr, $DS_{pr}$=1.16)

Int 2 was prepared by adapting the procedure for the preparation of Int 1, except that except that $N_2H_4 \cdot H_2O$ (1.87 eq) and AcOH (0.4 eq) were added to Eastman™ CAP482-20 (1.0 eq). $^1$H NMR, $^{13}$C NMR: $DS_{pr}$=1.16, $DS_{OH}$=1.84, C2DS=0.26, C3DS=0.32, $DS_{C6}$=0.57.

Intermediate 3 (CPr2EH, $DS_{pr}$=1.13 and $DS_{2EH}$=0.49)

To a 4-neck jacketed resin kettle reaction flask under a nitrogen atmosphere with overhead mechanical stirring was added anhydrous DMAC (1.86 mol) and NMI (0.39 mol). Int 1 (0.089 mol) was added to the RM, and the RM was stirred (30° C.) for 48 h. Then 2-EHCl (0.52 mol) in DMAC (0.089 mol) was added dropwise over 25 min. The RM was stirred (70° C.) for 16 h, and the crude product was precipitated by the addition of water (4 L). The solid was collected, continuously washed with deionized water for 6 h, and dried in vacuo (55° C.) overnight to give the title compound. $^1$H NMR and $^{13}$C NMR: $DS_{Pr}$=1.13, $DS_{2EH}$=0.49, $DS_{OH}$=1.38, C2DS=0.38, C3DS=0.40, C6DS=0,85.

Example 1

Ex 1 was prepared as described hi U320170306054 (Ex 12, Table 3).

Example 2

Ex 2 was prepared according to the procedure described in U.S. Application No. 62/891561 (Ex 7, Table 9).

Example 3

(CPr2EHBz)

To a stirred mixture in a RB flask containing DMAC (86 mL, 21.2 mol eq) and 1 MIM (16 mL, 4.5 mol eq.) under a nitrogen atm, was added Int 3 (10 g, 1.0 mol eq) which was dried in vacuo overnight. The RM was stirred for 4 h at 26° C. and then BzCl (5.1 g, 0.91 mol eq) in DMAC (14 mL)) was slowly added into the RM over 1 h. The RM was stirred for 14 h at 26° C. The crude product was precipitated iPrOH (2.2 L), and the solids was washed with water (2×500 mL), washed continuously with deionized water for 5 h, and dried in vacuo overnight to provide the title compound. $^1$H NMR and $^{13}$C NMR: $Ds_{pr}$=1.13, $Ds_{2EH}$=0.49, $Ds_{Bz}$=0.96, C2DS=0.94, C3DS=0.63, C6DS=1.00

Examples 4

(CPr2EHBz)

Ex 4 was prepared by adapting the procedure for the preparation of Ex 3. For Ex 5, Int 3 (10 g, 1.0 mol eq) and BzCl (5.48 g, 1.06 mole eq) were used. $^1$H NMR and $^{13}$C NMR: $Ds_{Pr}$=1.13, $DS_{2EH}$=0.49, $Ds_{Bz}$=1.02, C2DS=0.94, C3DS=0.68, C6DS=1.00

Example 5

General procedure was described in Application WO2019190756A1 (Preparation of Intermediate 1 and Example 1).

Step (1) Preparation of intermediate 4 Cellulose Crotonate ($Ds_{Cr}$=1.39)

1ARY cellulose pulp (70 g, 1.0 eq 5 wt. %) was added to a cooled (25° C.) jacketed reaction kettle, Then a solution of TFAA (151 g, 1.67 eq) in TFA (1180 g, 24 eq) was added to the cooled cellulose solid with overhead stirring. After the addition was complete, the RM was heated at 55° C., stirred for 16 hr, and then cooled to rt. Then, a solution of trans-crotonic acid (52.0 g, 1.4 eq), TFA (10 mL), and TFAA (154 g, 1.7 eq) was prepared and stirred for 45 min. The resulting reagent mixture was added to the RM at rt, and the resulting RM was stirred for 8 h. The RM was treated with deionized water (1000 mL) to provide a solid material which was filtered. The solids were suspended in iPrOH and stirred for 30 min and mixture was filtered. The resulting solids were suspended in aq. KOAc (5 M, 2000 mL) and stirred for 36 h. The solids were collected by filtration and washed continuously with deionized water for 8 h, and dried in vacuo (60° C., 12 h) to give the title intermediate. $^1$H NMR, $^{13}$C NMR: $DS_{Cr}$=1.39, $DS_{OH}$=1.61, C2DS=0.61, C3O5=0.72, C6DS=0.05.

Step 2, Preparation of Ex 5 Cellulose Crotonate Benzoate ($Ds_{Cr}$=1.39, $Ds_{Bz}$=0.94)

To an oven-dried 1000 mL jacketed 3-neck round bottomed flask equipped with a mechanical stirrer, Int 11 (20 g, 1.0 eq) followed by pyridine (150 mL) and DMAC (50 mL) were added to a jacketed round bottom flask under a $N_2$ atm. was charged using a solids addition funnel under an atm of nitrogen. The RM was heated to 50° C. and the mixture was stirred until dissolution of the solids, and then the RM was cooled to 25° C., BzCl (15.08 g, 1.4 eq) was then added over 2 min at 25° C. and the RM was stirred for 30 min followed by stirring at 50° C. overnight. Acetone (~150 mL) was added to the RM followed by deionized water (2200 mL) to precipitate the crude product. The crude product was filtered and washed with a 1:1 solution of iPrOH:water (2×). The crude product was washed with deionized water continuously for at least 5 h, the solids were filter collected and dried in vacuo (22.5 mm Hg, 60° C.) overnight. $^{1H}$ NMR, $^{13}$C NMR: $DS_{Cr}$=1.39, $DS_{Bz}$=0.94, $DS_{OH}$=0.29, C2DS=0.83, C3DS=0.89, C6DS=0.99.

EX 6 (CPrBz)

To a stirred mixture RB flask containing DMAC (172 mL, 21.2 mol eq) and 1--methylimidazole (32 mL, 4.5 mol eq.) in a nitrogen atm, was added Int 2 (20 g, 1.0 mol eq) which was dried in vacuo overnight. The RM was stirred for 4 h at 50° C., cooled to 26° C., and then BzCl (14.2 g, 1.3 mol eq in DMAC (14 mL)) was slowly added into the RM over 1 h. The RM was stirred for 14 h at 26° C. The crude product was precipitated iPrOH (2.2 L), and the solids was washed with water (2×500 mL), washed continuously with deionized water for 5 h, and dried in vacuo overnight to provide the title compound, $^1$H NMR and $^{13}$C NMR: $Ds_{Pr}$=1.18, $Ds_{Bz}$=1.25 (Table 1).

EX7 (CPrBz)

EX 7 was prepared in the similar procedure except that 1.5 mol eq BzCl was added.

Table 1 provides a summary of the characterization information for the regioselectively substituted cellulose esters Ex 1-7.

TABLE 1

| Ex # | Total DS | FAk/ SAk | $DS_{FAk}/$ $DS_{SAk}$ | $C2DS_{FAk}$, $C3DS_{FAk}$, $C6DS_{FAk}$ | $C2DS_{SAk}$, $C3DS_{SAk}$, $C6DS_{SAk}$ | ArCO | $DS_{ArCO}$ | C2DS, C3DS, C6DS | $C2DS_{ArCO}$ + $C3DS_{ArCO}$ | $(C2DS_{ArCO}$ + $C3DS_{ArCO})$ − $C6DS_{ArCO}$ |
|---|---|---|---|---|---|---|---|---|---|---|
| 1 | 2.75 | Pr/Pv | 1.18/ 0.39 | | | Np | 1.18 | 0.99, 0.70, 0.92 | | |
| 2 | 2.83 | Pr/ 2-EH | 1.18/ 0.39 | | | Np | 1.26 | 1.00, 0.70, 1.00 | | |
| 3 | 2.58 | Pr/ 2-EH | 1.13/ 0.49 | 0.26, 0.34, 0 53 | 0.12, 0.06, 0.32 | Bz | 0.96 | 0.94, 0.63, 1.00 | 0.79 | 0.62 |
| 4 | 2.64 | Pr/ 2-EH | 1.13/ 0.49 | 0.26, 0.34, 0.53 | 0.12, 0.06, 0.32 | Bz | 1.02 | 0.94, 0.68, 1.00 | 0.84 | 0.68 |
| 5 | 2.71 | Cr | 1.39 | | | Bz | 1.33 | 0.83, 0.89, 0.99 | | |
| 6 | 2.43 | Pr | 1.18 | 0.28, 0.31, 0.59 | 0.56, 0.27, 0.42 | Bz | 1.25 | 0.84, 0.58, 1.00 | 0.83 | 0.41 |
| 7 | 2.59 | Pr | 1.18 | 0.28, 0.31, 0 | 0.62, 0.34, 0.45 | Bz | 1.41 | 0.90, 0.65, 1.0 | 0.96 | 0.51 |

TABLE 2

| Film | CE (Ex #) | Component A (wt %) | Casting Solvent | Film thickness (d) [μm] |
|---|---|---|---|---|
| 1.1 | 1 | — | MEK:MIPK (20:80) | 6.22 |
| 1.2 | 1 | DPDO (10) | MEK | 10.91 |
| 1.3 | 1 | Avobenzone (10) | MEK:MIPK (20:80) | 9.38 |
| 1.4 | 1 | Avobenzone (15) | DCM:EtOH (90:10) | 12.05 |
| 1.5 | 1 | Avobenzone (20) | DCM:EtOH (90:10) | 6.67 |
| 1.6 | 1 | Tinuvin 1577 (10) | DCM:EtOH (90:10) | 9.85 |
| 1.7 | 1 | Tinuvin 479 (10) | DCM:Acetone (90:10) | 7.03 |
| 1.8 | 1 | Tinuvin 479 (7) | DCM:EtOH (90:10) | 9.90 |
| 1.9 | 1 | Tinuvin 479 (15) | DCM:Acetone (90:10) | 10.51 |
| 2.1 | 2 | — | MEK | 11.58 |
| 2.2 | 2 | Avobenzone (15) | MEK | 10.42 |
| 3.1 | 3 | — | DCM/Acetone (90:10) | 50.20 |
| 3.2 | 3 | Tinuvin 1577 (5) | DCM/Acetone (90:10) | 54.25 |
| 4.1 | 4 | — | DCM/Acetone (90:10) | 55.00 |
| 4.2 | 4 | Avobenzone (7) | DCM/Acetone (90:10) | 55.33 |
| 5.1 | 5 | DEP (10) | DCM/Acetone (90:10) | 66.00 |
| 5.2 | 5 | Avobenzone (5) | DCM/Acetone (90:10) | 46.20 |
| 6.1 | 6 | Tinuvin479 (4) | DCM/MeOH (95/5) | 36.20 |
| 6.2 | 6 | Avobenzone (4) | DCM/MeOH (95/5) | 28.50 |

Table 2 provides the characterization of films prepared from various regioselectively substituted cellulose esters formulated with component A along with the solvent system used to cast the films.

Percentages of component A and plasticizers in the films are defined as below. Percentage of component A or plasticizers=weight of component A or plasticizers/total weight of (cellulose esters, component A, plasticizers and all other components added).

Dope Solution concentration is defined as below, Dope solution concentration=total weight of (cellulose esters, component A, plasticizers and all other components added excluding solvents)/total weight of (cellulose esters, component A, plasticizers, all other components added and solvents)

For example, for film 1.3, Resin 1 (5 g, 90 wt %) and component A (0.556 g, 10 wt %) were added into MEK:MIPK (20:80) (40.74 g, concentration at 12 wt %). The mixture was put on roller until all components were fully mixed and dear solution was obtained.

TABLE 2-continued

| Film | CE (Ex #) | Component A (wt %) | Casting Solvent | Film thickness (d) [μm] |
|---|---|---|---|---|
| 7.1 | 7 | Tinuvin 479 (6) | DCM/MeOH (95/5) | 32.80 |
| 7.2 | 7 | Avobenzone (6) | DCM/MeOH (95/5) | 33.50 |

As shown in Table 3, compared to control film samples, the invention films samples showed improved wavelength dispersion. For example, compared to Film 1.1 (control), film 1.2 and 1.3 showed improved wavelength dispersion with $R_{th}(450\ nm)/R_{th}(550\ nm)$ equal to or smaller than 1.07 and $R_{th}(650\ nm)/R_{th}(550\ nm)$ equal to or greater than 0.96. Film 1.6 and 1.8 further showed further improved wavelength dispersion with $R_{th}(450\ nm)/R_{th}(550\ nm)$ equal to or smaller than 1.05 and $R_{th}(650\ nm)/R_{th}(550\ nm)$ equal to or greater than 0.96, Film 1.4, 1.5, 1.7 and 1.9 showed further improved wavelength dispersion with $R_{th}(450\ nm)/R_{th}(550\ nm)$ equal to or smaller than 0.92 and $R_{th}(650\ nm)/R_{th}(550\ nm)$ equal to or greater than 1.0.

Compared to Film 2.1 (control), Film 2.2 also showed improved wavelength dispersion $R_{th}(450\ nm)/R_{th}(550\ nm)$ equal to or smaller than 1.05 and $R_{th}(650\ nm)/R_{th}(550\ nm)$ equal to or greater than 0.96.

Compared to Film 3.1, Film 3.2 also showed improved wavelength dispersion $R_{th}(450\ nm)/R_{th}(550\ nm)$ equal to or smaller than 1.03 and $R_{th}(650\ nm)/R_{th}(550\ nm)$ equal to or greater than 0.97.

Compared to Film 4.1, Film 4.2 also showed improved wavelength dispersion $R_{th}(450\ run)/R_{th}(550\ nm)$ equal to or smaller than 0.94 and $R_{th}(650\ nm)/R_{th}(550\ nm)$ equal to or greater than 1.00.

Compared to Film 5.1, Film 5.2 also showed improved wavelength dispersion $R_{th}(450\ nm)/R_{th}(550\ nm)$ equal to or smaller than 0.98 and $R_{th}(650\ nm)/R_{th}(550\ nm)$ equal to or greater than 0.98.

Film 6.1, 6.2, 7.1 and 7.2 have wavelength dispersion wavelength dispersion $R_{th}(450\ nm)/R_{th}(550\ nm)$ equal to or smaller than 1.0 and $R_{th}(650\ nm)/R_{th}(550\ nm)$ equal to or greater than 0.98

Table 3 provides a summary of additional optical information for the films.

TABLE 3

| Film | $R_e(583\ nm)$ [nm] | $R_{th}(589\ nm)$ | $[R_e(589\ nm)/d(nm)]*10^3$ | $[R_{th}(589\ nm)/d(nm)]*10^3$ | $R_{th}(450\ nm)/R_{th}(559\ nm)$ | $R_{th}(650\ nm)/R_{th}(550\ nm)$ |
|---|---|---|---|---|---|---|
| 1.1 | 0.3 | 45.1 | 0.06 | 7.24 | 1.12 | 0.95 |
| 1.4 | 6.3 | 46.6 | 0.53 | 3.87 | 0.91 | 1.00 |
| 1.5 | 0.3 | 26.6 | 0.05 | 4.05 | 0.89 | 1.01 |
| 1.6 | 0.2 | 30.6 | 0.02 | 3.10 | 1.05 | 0.96 |
| 1.7 | 0.3 | 16.0 | 0.04 | 2.24 | 0.89 | 1.00 |
| 1.9 | 0.2 | 17.6 | 1.74 | 1.74 | 0.76 | 1.06 |
| 2.1 | 0.4 | 117.2 | 0.04 | 10.16 | 1.11 | 0.95 |
| 2.2 | 0.4 | 51.5 | 0.04 | 4.95 | 1.05 | 0.96 |
| 3.1 | 4.3 | 274.5 | 0.09 | 5.46 | 1.10 | 0.95 |
| 3.2 | 4.9 | 179.2 | 0.09 | 3.30 | 1.03 | 0.97 |
| 4.1 | 6.1 | 301.7 | 0.11 | 5.50 | 1.09 | 0.96 |
| 4.2 | 8.4 | 211.5 | 0.15 | 3.82 | 0.94 | 1.00 |
| 5.1 | 8.6 | 129.1 | 0.13 | 1.95 | 1.10 | 0.95 |
| 5.2 | 3.5 | 82.3 | 0.08 | 1.78 | 0.98 | 0.98 |
| 6.1 | 1.7 | 40.2 | 0.05 | 1.11 | 1.03 | 0.96 |
| 6.2 | 2.1 | 54.7 | 0.06 | 1.67 | 0.97 | 0.97 |
| 7.1 | 2.3 | 53.3 | 0.08 | 1.88 | 0.96 | 0.99 |
| 7.2 | 2.1 | 92.8 | 0.06 | 2.77 | 0.93 | 1.00 |

What is claimed is:
1. A film, comprising:
(1) a regioselectively substituted cellulose ester comprising:
(i) a plurality of aromatic-CO— substituents;
(ii) a plurality of a first unsaturated or saturated ($C_{1-6}$) alkyl-CO— substituents; and
(iii) a plurality of hydroxyl substituents;
wherein:
the degree of substitution for the hydroxyl ("$DS_{OH}$") is from 0 to 0.7,
the degree of substitution for the aromatic-CO-substituent ("$DS_{Arco}$") is from 0.8 to 1.6,
the degree of substitution for the ($C_{1-6}$)alkyl-CO— substituent ("$DS_{AK}$") is from 0.9-2.2, and
the plurality of aromatic-CO-— is an ($C_{6-20}$) aryl-CO—, wherein the aryl is unsubstituted or substituted by 1-5 $R^1$; and
(2) a component A that is

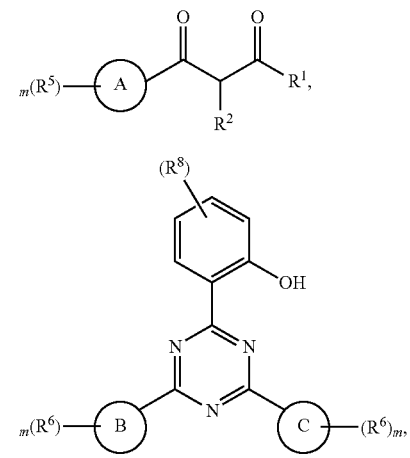

wherein:
ring A is an ($C_{6-20}$)aryl or a 5 to 10-membered heteroaryl containing 1-4 heteroatoms selected from the group consisting of N, O, and S;

ring B is $(C_{6-20})$aryl or 5 to 10 membered heteroaryl containing 1-4 heteroatoms selected from the group consisting of N, O, and S;

ring C is $(C_{6-20})$aryl; or 5 to 10 membered heteroaryl containing 1-4 heteroatoms selected from the group consisting of N, O, and S;

$R^1$ is alkyl, haloalkyl, $(C_{6-20})$aryl optionally by 1-5 substituted by alkyl, haloalkyl, alkoxy, haloalkoxy, halo; 5 to 10-membered heteroaryl containing 1-4 heteroatoms selected from the group consisting of N, O, and S; —$CH_2C(O)$—$R^3$;

$R^2$ is independently hydrogen, alkyl, or haloalkyl;

$R^3$ is alkyl, haloalkyl, $(C_{6-20})$aryl, or 5 to 10-membered heteroaryl containing 1-4 heteroatoms selected from the group consisting of N, O, and S, wherein the aryl or heteroaryl are unsubstituted or substituted by 1-5 $R^6$; $R^4$ is $(C_{1-20})$ alkyl, halo $(C_{1-20})$ alkyl, $(C_{1-20})$ alkyl-CO—$(C_{1-20})$alkyl, wherein each is unsubstituted or substituted by 1-3 hydroxyl, $(C_{1-20})$alkoxyl, or halo $(C_{1-20})$alkoxyl. hydroxy$(C_{1-20})$alkyl, $(C_{1-20})$alkoxy-$(C_{1-20})$alkyl, $(C_{1-20})$alkoxy -hydroxy $(C_{1-20})$alkyl, or $(C_{1-20})$alkoxy-$(C_{1-20})$alkyl—CO—$(C_{1-20})$alkyl-;

each $R^5$ is independently hydroxy, cyano, alkyl, haloalkyl, alkoxy, haloalkoxy, or halo;

each $R^6$ is independently hydroxy, cyano, alkyl, haloalkyl, alkoxy, haloalkoxy, or halo or $(C_{6-20})$aryl, wherein the aryl is unsubstituted or substituted by 1-5 $R^7$;

each $R^7$ is independently hydroxyl, $(C_{1-6})$alkyl, halo $(C_{1-6})$alkyl, or $(C_{1-6})$alkoxyl;

$R^8$ is $R^4$—O—, $(C_{1-20})$alkyl, halo$(C_{1-20})$alkyl, $(C_{1-20})$alkyl-CO—$(C_{1-20})$alkyl-, $(C_{1-20})$alkenyl, $(C_{1-20})$alkenyl-O—, $(C_{1-20})$alkyl-COO—$(C_{1-20})$alkyl-, $(C_{1-20})$alkyl—COO—, $(C_{1-20})$alkyl, wherein 1-2 carbon atoms are replaced by O, N, or S, $(C_{6-10})$ aryl, 5- to 10-membered heteroaryl containing 1-4 heteroatoms selected from the group consisting of N, O, and S, wherein each of the groups are unsubstituted or substituted by 1-3 hydroxyl, $(C_{1-20})$ alkoxyl, or halo $(C_{1-20})$alkoxyl. hydroxy$(C_{1-20})$alkyl, $(C_{1-20})$ alkoxy—$(C_{1-20})$alkyl, $(C_{1-20})$alkoxy-hydroxy$(C_{1-20})$alkyl, or $(C_{1-20})$alkoxy-$(C_{1-20})$alkyl-CO—$(C_{1-20})$alkyl-;

each m is 1, 2, 3, 4 or 5;

n is 1, 2, 3, 4, or 5, wherein:

the component A is present from 1 wt % to 30 wt %, based on the total weight of the composition, the thickness of the film ("d") in microns is from 1 μm to 200 μm, the film exhibits a $R_e$ (589 nm) that is in the range of −10 nm to 10 nm, the ratio of the $R_{th}$ (589 nm) and d (nm) multiplied by $10^3$ is greater than 1.0, the $R_{e1}$ (589 nm) is the in-plane retardation measured at 589 nm, the $R_{th}$(589 nm) is the out-of-plane retardation measured at 589 nm.

2. The film of claim 1, wherein the ratio of $R_{th}$(450 nm) to $R_{th}$(550 nm) is less than 1.05, wherein the $R_{th}$(450 nm) is the out-of-plane retardation measured at 450 nm, and the $R_{th}$(550 nm) is the out-of-plane retardation measured at 550 nm.

3. The film of claim 1, wherein the ratio of $R_{th}$ (450 nm) to $R_{th}$ (550 nm) is from 0.75 to 0.85.

4. The film of claim 1, wherein ratio of $R_{th}$(650 nm) to $R_{th}$(550 nm) is greater than 0.95, wherein the $R_{th}$(650 nm) is the out-of-plane retardation measured at 650 nm and the $R_{th}$(550 nm) is the out-of-plane retardation measured at 550 nm.

5. The film of claim 4, wherein ratio of $R_{th}$ (650 nm) to $R_{th}$ (550nm) is from 1.10 to 1.25.

6. The film of claim 1, $R_{th}$ is from 20 to 200 nm.

7. The film of claim 1, wherein the component A is 1,3-diphenyl-1,3-propanedione, avobenzone, 2-(4,6-diphenyl-1,3,5-triazin-2-yl)-5-(hexyloxy)phenol, isooctyl 2-(4-(4,6-di([1,1'-biphenyl]-4-yl)-1,3,5-triazin-2-yl)-3-hydroxyphenoxy)propanoate, 6,6'-(6-(2,4-dibutoxyphenyl)-1,3,5-triazine-2,4-diyl)bis(3-butoxyphenol), or combinations thereof.

8. The film of claim 1, wherein the component A is present from 1 wt % to 20 wt %.

9. The film of claim 1, wherein the plurality of aromatic-CO— is benzoyl or naphthoyl, unsubstituted or substituted by 1-5 $R^1$.

10. The film of claim 1, wherein the first unsaturated or saturated $(C_{1-20})$alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or crotonyl.

11. The film of claim 1, wherein the cellulose ester further comprises a plurality of a second $(C_{1-20})$alkyl-CO— substituent.

12. The film of claim 1, wherein the second $(C_{1-20})$alkyl-CO— substituent is acetyl, propionyl, butyryl, isobutyryl, 3-methylbutanoyl, pentanoyl, 4-methylpentanoyl, 3-methylpentanoyl, 2-methylpentanoyl, hexanoyl, or 2-ethylhexanoyl.

* * * * *